(12) United States Patent
Tsai

(10) Patent No.: US 8,579,275 B1
(45) Date of Patent: Nov. 12, 2013

(54) DUPLEX DOCUMENT FEEDING DEVICE

(75) Inventor: Shang-Hsien Tsai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/599,799

(22) Filed: Aug. 30, 2012

(30) Foreign Application Priority Data

Jul. 20, 2012 (TW) ............................... 101126281A

(51) Int. Cl.
*B65H 5/22* (2006.01)
*B65H 83/00* (2006.01)
*B65H 85/00* (2006.01)
*B65H 29/68* (2006.01)

(52) U.S. Cl.
USPC ........... 271/3.01; 271/3.14; 271/69; 271/301; 271/186

(58) Field of Classification Search
USPC ......... 271/3.14, 3.01, 301, 69, 186, 273, 314; 399/364, 373
See application file for complete search history.

(56) References Cited

U.S. PATENT DOCUMENTS

| | | | |
|---|---|---|---|
| 2004/0217537 A1* | 11/2004 | Ohama | 271/3.14 |
| 2007/0081212 A1* | 4/2007 | Tonami et al. | 359/197 |
| 2009/0085280 A1* | 4/2009 | Litman et al. | 271/186 |
| 2010/0295233 A1* | 11/2010 | Kano | 271/3.14 |
| 2010/0302298 A1* | 12/2010 | Moriyama et al. | 347/16 |
| 2010/0314822 A1* | 12/2010 | Tsao | 271/3.14 |
| 2011/0013961 A1* | 1/2011 | Torimaru et al. | 400/582 |

* cited by examiner

*Primary Examiner* — David H Bollinger
(74) *Attorney, Agent, or Firm* — Kirton McConkie; Evan R. Witt

(57) ABSTRACT

A duplex document feeding device includes a first paper transfer channel, a second paper transfer channel, a paper exit, a power source, a paper pick-up mechanism, a paper ejecting mechanism, and a linking mechanism. The paper ejecting mechanism includes an ejecting drive roller and an ejecting idler roller. After a paper is ejected from the first paper transfer channel and the paper is introduced into the second paper transfer channel by the paper ejecting mechanism, the linking mechanism is driven by the power source, so that the ejecting idler roller is shifted and moved away from the ejecting drive roller. Consequently, the front end of the paper can be smoothly ejected from the paper exit.

31 Claims, 20 Drawing Sheets

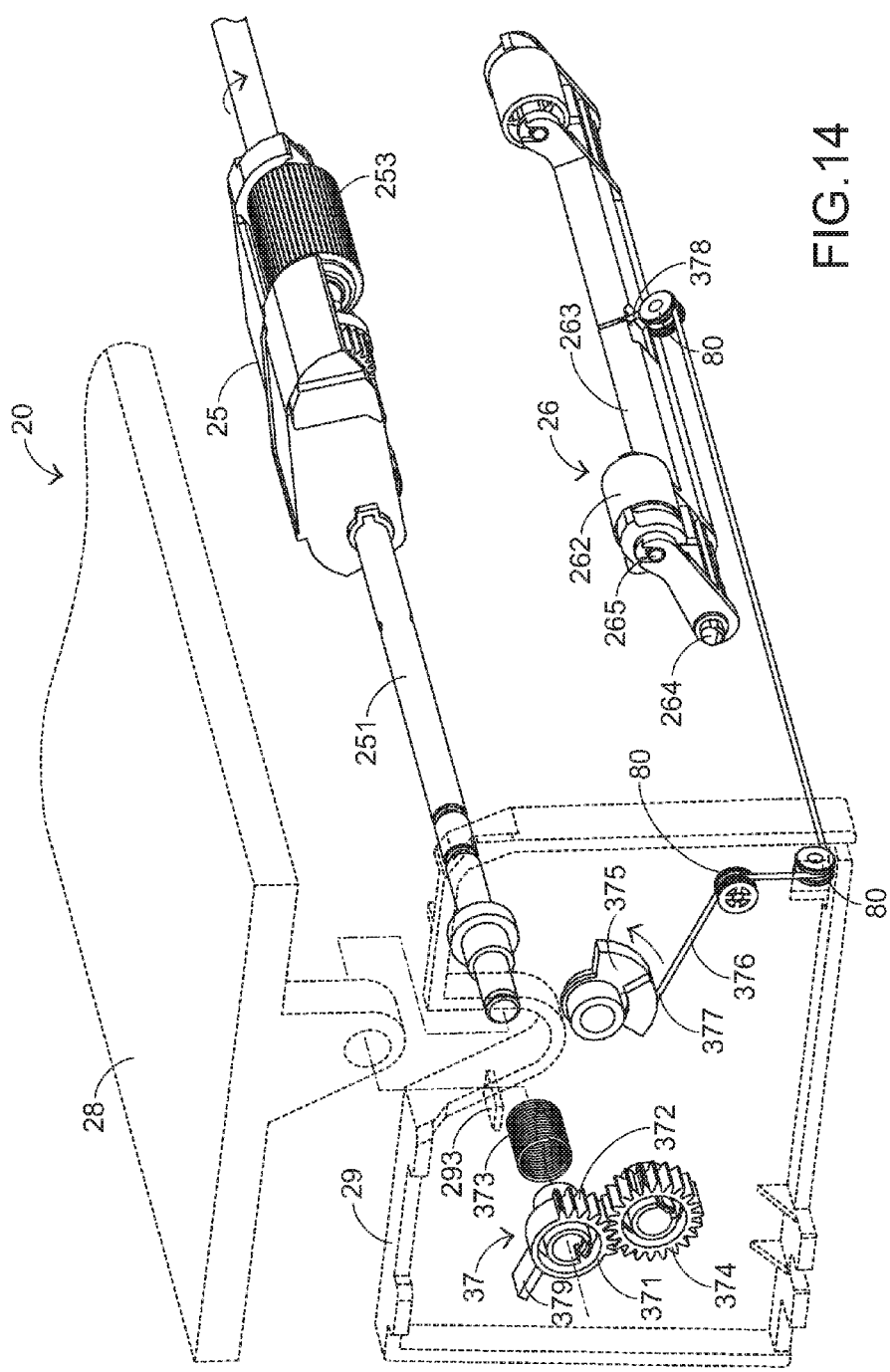

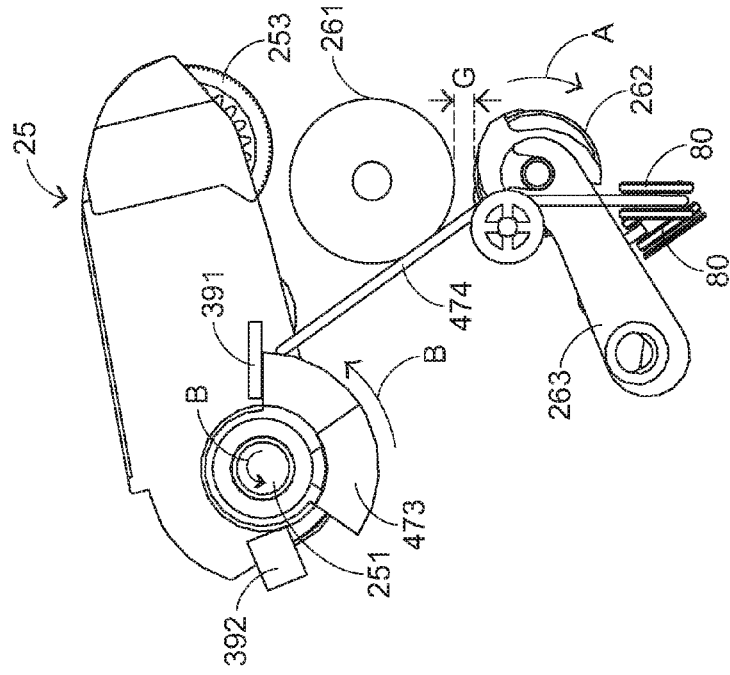
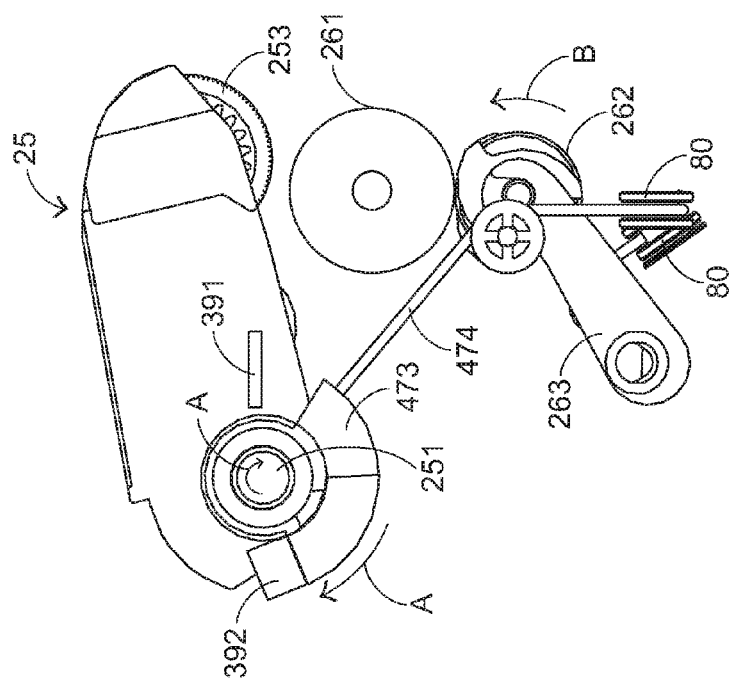

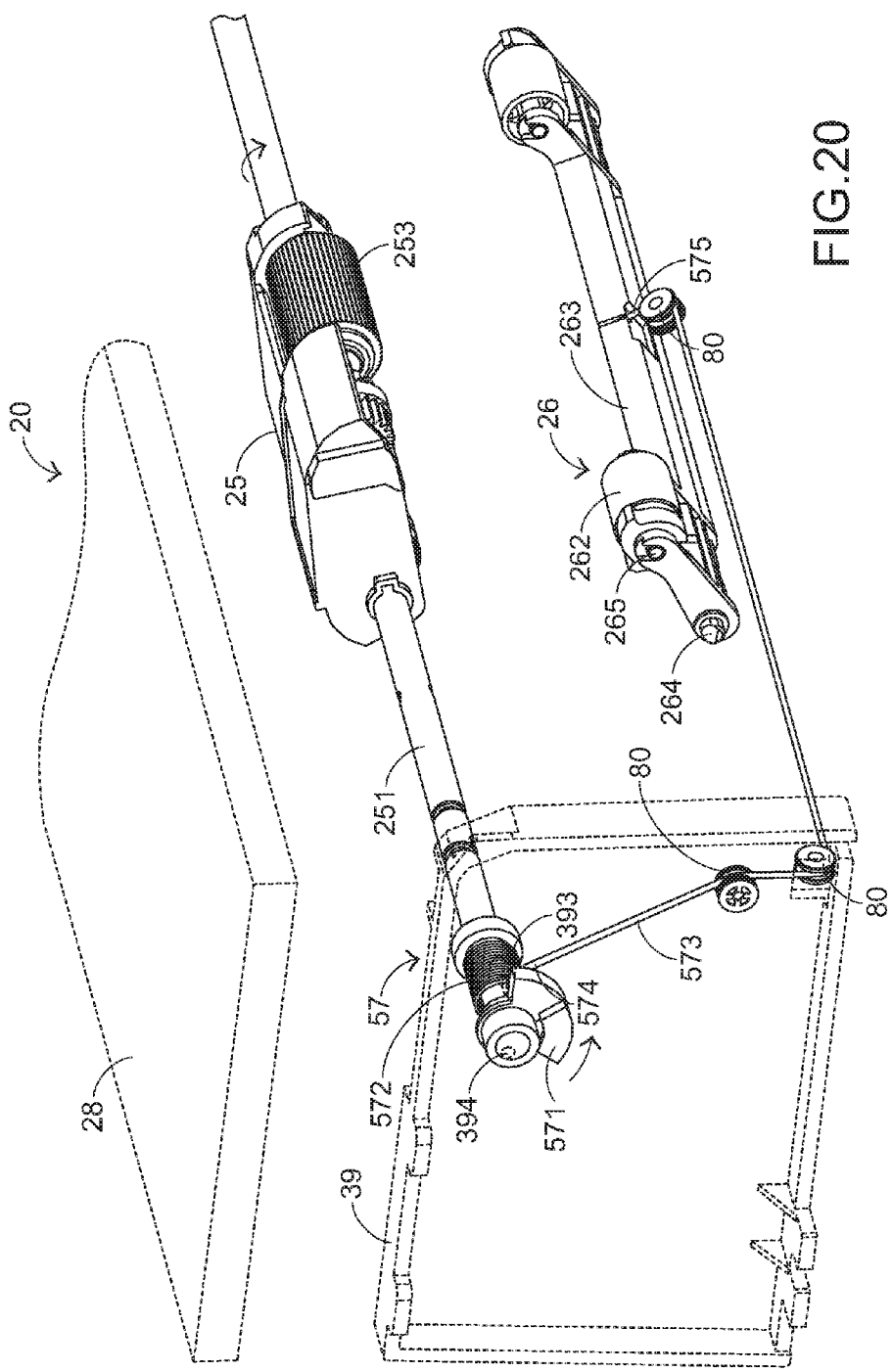

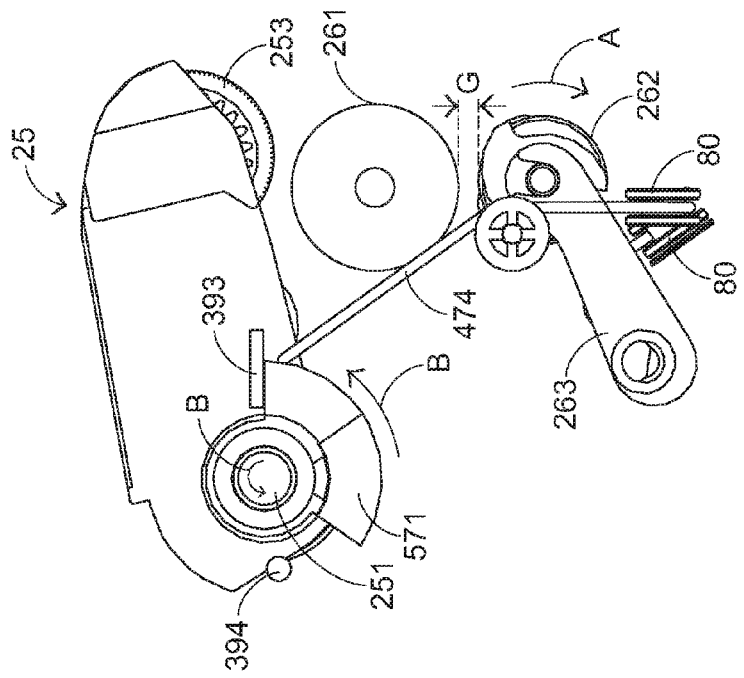
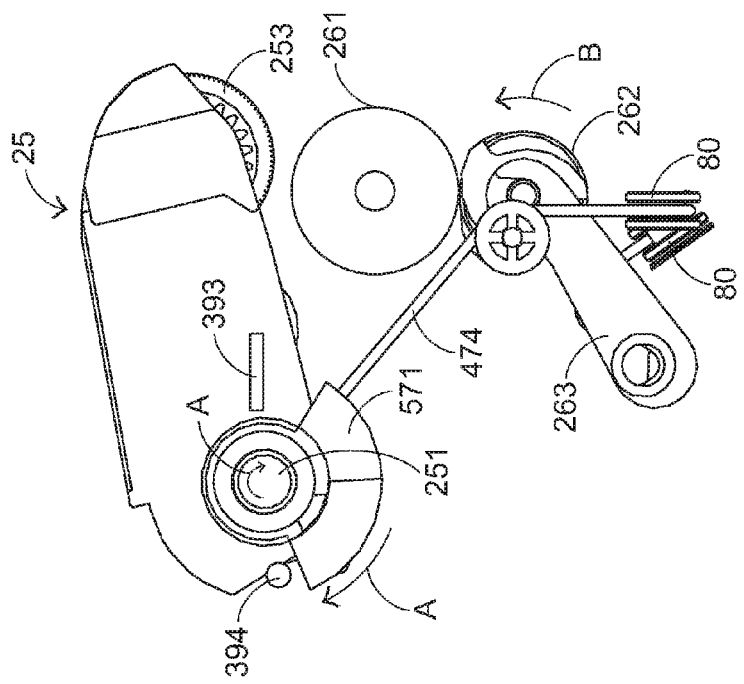

DUPLEX DOCUMENT FEEDING DEVICE

FIELD OF THE INVENTION

The present invention relates to a duplex document feeding device, and more particularly to a duplex document feeding device with a detachable paper ejecting mechanism.

BACKGROUND OF THE INVENTION

For increasing the efficiency of feeding papers in a duplex mode, the current office machine such as a copying device, a printing device or a scanning device is usually equipped with a duplex document feeding device. By the duplex document feeding device, a stack of papers may be automatically fed into the office machine in the duplex mode in order to be scanned or printed.

FIG. 1 is a schematic cross-sectional view illustrating a conventional duplex document feeding device. As shown in FIG. 1, the conventional duplex document feeding device 10 comprises a first paper transfer channel 11, a second paper transfer channel 12, a paper exit 13, a paper ejecting mechanism 14, a solenoid valve 17, and plural transferring rollers 18. The paper ejecting mechanism 14 comprises an ejecting drive roller 15 and an ejecting idler roller 16. In addition, the ejecting drive roller 15 is contacted with the ejecting idler roller 16.

Please refer to FIG. 1 again. The paper ejecting mechanism 14 is located at the paper exit 13 for ejecting the paper from the duplex document feeding device 10 or introducing the paper into the duplex document feeding device 10. The solenoid valve 17 is connected with the ejecting idler roller 16 of the paper ejecting mechanism 14 for driving movement of the ejecting idler roller 16.

Moreover, the transferring rollers 18 are disposed in the second paper transfer channel 12 for transferring the paper within the first paper transfer channel 11 or the second paper transfer channel 12. The first paper transfer channel 11 and the second paper transfer channel 12 are disposed within the duplex document feeding device 10 for allowing the paper to go through.

A process of feeding papers in a duplex mode will be illustrated in more details as follows. After the paper is fed into the duplex document feeding device 10, the paper is transferred through the first paper transfer channel 11 and ejected from the paper exit 13. Then, the paper is introduced into the second paper transfer channel 12 by the paper ejecting mechanism 14. Then, the paper is ejected from the paper exit 13 by the transferring rollers 18.

In a case that the length of the paper transferred through the second paper transfer channel 12 is too longer, the front end of the paper is possibly overlapped with the portion of the paper which is just fed into the second paper transfer channel 12. Under this circumstance, the front end of the paper fails to be smoothly transmitted to the paper exit 13. For solving this drawback, after the paper is introduced into the second paper transfer channel 12 by the paper ejecting mechanism 14 and transmitted to the transferring rollers 18 to assure that the paper can be continuously moved, the ejecting idler roller 16 is shifted by the solenoid valve 17 of the duplex document feeding device 10. Meanwhile, the ejecting idler roller 16 is moved away from the ejecting drive roller 15, and thus the front of the paper can be smoothly transferred through the paper exit 13.

From the above discussions, the use of the solenoid valve to move the ejecting idler roller away from the ejecting drive roller may result in a gap between the ejecting drive roller and the ejecting idler roller. Due to the gap, the front end of the paper is no longer overlapped with the portion of the paper just fed into the second paper transfer channel, so that the front of the paper can be smoothly transferred through the paper exit. However, there are still some drawbacks. For example, since the unit price of the solenoid valve is high, the use of the solenoid valve will undoubtedly increase the fabricating cost of the duplex document feeding device.

SUMMARY OF THE INVENTION

The present invention provides a cost-effective duplex document feeding device.

In accordance with an aspect of the present invention, there is provided a duplex document feeding device. The duplex document feeding device includes a first paper transfer channel, a second paper transfer channel, and a paper exit. The duplex document feeding device further includes a power source, a paper pick-up mechanism, a paper ejecting mechanism, and a linking mechanism. The power source is used for providing a motive power. The paper pick-up mechanism is used for feeding a paper into the first paper transfer channel. Moreover, the paper pick-up mechanism includes a driving shaft, and the driving shaft is connected with the power source. The paper ejecting mechanism is located at the paper exit. Moreover, the paper ejecting mechanism includes an ejecting drive roller and an ejecting idler roller. The ejecting drive roller is connected with the power source for ejecting the paper from the first paper transfer channel and then introducing the paper into the second paper transfer channel. The ejecting idler roller is contacted with the ejecting drive roller. The linking mechanism is in power communication with the power source and the ejecting idler roller. After the paper is ejected from the first paper transfer channel and the paper is introduced into the second paper transfer channel by the paper ejecting mechanism, the linking mechanism is driven by the power source, so that the ejecting idler roller is shifted and moved away from the ejecting drive roller.

In an embodiment, the linking mechanism is connected with the driving shaft and the ejecting idler roller. After the paper is introduced into the second paper transfer channel by the paper ejecting mechanism, the linking mechanism is driven to be linked with the ejecting idler roller by the power source, so that the ejecting idler roller is shifted and moved away from the ejecting drive roller.

In an embodiment, the paper pick-up mechanism further includes a paper pick-up roller and a paper separation roller for feeding the paper into the first paper transfer channel, wherein the paper separation roller is fixed on the driving shaft.

In an embodiment, the power source is a motor.

In an embodiment, the duplex document feeding device further includes an upper cover, wherein the driving shaft is penetrated through the upper cover.

In an embodiment, the duplex document feeding device further includes a sidewall. The driving shaft is penetrated through the sidewall.

In an embodiment, the duplex document feeding device further includes plural transferring rollers. The plural transferring rollers are disposed in the first paper transfer channel and the second paper transfer channel, and the plural transferring rollers are connected with the power source.

In an embodiment, the linking mechanism includes a first gear, a first one-way clutch, a second gear, a rotating plate, a second one-way clutch, and a connecting member. The first gear is sheathed around the driving shaft and located at a side of the driving shaft. The first one-way clutch is connected with the driving shaft and the first gear. The second gear is engaged with the first gear. The rotating plate is located at a side of the second gear. The second one-way clutch is connected with the second gear and the rotating plate. A first end of the connecting member is connected with the rotating plate, and a second end of the connecting member is connected with the paper ejecting mechanism. As the rotating plate is driven to be rotated in a first direction by the driving shaft, the ejecting idler roller is driven to be moved away from the ejecting drive roller by the connecting member. As the rotating plate is driven to be rotated in a second direction by the driving shaft, the ejecting idler roller is driven to be moved toward the ejecting drive roller by the connecting member.

In an embodiment, the duplex document feeding device further includes a sidewall. The sidewall includes a first stopping block and a second stopping block. The first stopping block and the second stopping block are respectively located at bilateral sides of the rotating plate. As the rotating plate is rotated in the first direction to be contacted with the first stopping block, the rotating plate is not rotated. As the rotating plate is rotated in the second direction to be contacted with the second stopping block, the rotating plate is not rotated.

In an embodiment, the connecting member is a flexible wire.

In an embodiment, the connecting member is a belt.

In an embodiment, the first one-way clutch and the second one-way clutch are springs, and a helix direction of the first one-way clutch is opposite to a helix direction of the second one-way clutch.

In an embodiment, the paper ejecting mechanism further includes a base. The ejecting idler roller is fixed on the base, and the second end of the connecting member is connected with the base of the paper ejecting mechanism.

In an embodiment, the linking mechanism includes a first one-way clutch, a second one-way clutch, a rotating plate, and a connecting member. The first one-way clutch is sheathed around the driving shaft. The second one-way clutch is connected with the first one-way clutch. The rotating plate is connected with the second one-way clutch. A first end of the connecting member is connected with the rotating plate, and a second end of the connecting member is connected with the paper ejecting mechanism. As the rotating plate is driven to be rotated in a first direction by the driving shaft, the ejecting idler roller is driven to be moved away from the ejecting drive roller by the connecting member. As the rotating plate is driven to be rotated in a second direction by the driving shaft, the ejecting idler roller is driven to be moved toward the ejecting drive roller by the connecting member.

In an embodiment, the duplex document feeding device further includes a sidewall. The sidewall includes a first stopping block and a second stopping block. The first stopping block and the second stopping block are respectively located at bilateral sides of the rotating plate. As the rotating plate is rotated in the first direction to be contacted with the first stopping block, the rotating plate is not rotated. As the rotating plate is rotated in the second direction to be contacted with the second stopping block, the rotating plate is not rotated.

In an embodiment, the connecting member is a flexible wire.

In an embodiment, the connecting member is a belt.

In an embodiment, the first one-way clutch and the second one-way clutch are springs, and a helix direction of the first one-way clutch is opposite to a helix direction of the second one-way clutch.

In an embodiment, the paper ejecting mechanism further includes a base. The ejecting idler roller is fixed on the base, and the second end of the connecting member is connected with the base of the paper ejecting mechanism.

In an embodiment, the linking mechanism includes a notched gear, a one-way clutch, a gear, a rotating plate, and a connecting member. The notched gear is sheathed around the driving shaft and located at a side of the driving shaft. The notched gear includes a toothed part and a post. The toothed part is disposed around a portion of a circumference of the notched gear. The one-way clutch is sheathed around the driving shaft, wherein through said one-way clutch, said driving shaft is connected with the notched gear. The gear is engaged with the toothed part of the notched gear. The rotating plate is located at a side of the gear. A first end of the connecting member is connected with the rotating plate, and a second end of the connecting member is connected with the paper ejecting mechanism. As the rotating plate is driven to be rotated in a first direction by the driving shaft, the ejecting idler roller is driven to be moved away from the ejecting drive roller by the connecting member. As the rotating plate is driven to be rotated in a second direction by the driving shaft, the ejecting idler roller is driven to be moved toward the ejecting drive roller by the connecting member.

In an embodiment, the duplex document feeding device further includes a sidewall. The sidewall includes a stopping block. The stopping block is located at a side of the notched gear. As the notched gear is rotated in the first direction to be contacted with the stopping block, the notched gear is not rotated. As the notched gear is rotated in the second direction to be contacted with the stopping block, the notched gear is not rotated.

In an embodiment, the connecting member is a flexible wire.

In an embodiment, the connecting member is a belt.

In an embodiment, the paper ejecting mechanism further includes a base. The ejecting idler roller is fixed on the base, and the second end of the connecting member is connected with the base of the paper ejecting mechanism.

In an embodiment, the duplex document feeding device further includes plural transferring rollers. The plural transferring rollers are disposed in the first paper transfer channel and the second paper transfer channel. Moreover, the plural transferring rollers are connected with an additional power source.

In an embodiment, the linking mechanism includes a rotating plate, a one-way clutch, and a connecting member. The rotating plate is located at a side of the driving shaft. The one-way clutch is connected with the driving shaft and the rotating plate. A first end of the connecting member is connected with the rotating plate, and a second end of the connecting member is connected with the paper ejecting mechanism. As the rotating plate is driven to be rotated in a first direction by the driving shaft, the ejecting idler roller is driven to be moved away from the ejecting drive roller by the connecting member. As the rotating plate is driven to be rotated in a second direction by the driving shaft, the ejecting idler roller is driven to be moved toward the ejecting drive roller by the connecting member.

In an embodiment, the duplex document feeding device further includes a sidewall, a stopping block and a sensor. The stopping block is disposed on the sidewall. The stopping block and the sensor are respectively located at bilateral sides of the rotating plate. As the rotating plate is rotated in the first direction to be contacted with the stopping block, the rotating plate is not rotated. As the rotating plate is rotated in the second direction to trigger the sensor, the rotating plate is not rotated.

In an embodiment, the connecting member is a flexible wire.

In an embodiment, the connecting member is a belt.

In an embodiment, the first one-way clutch and the second one-way clutch are springs, and a helix direction of the first one-way clutch is opposite to a helix direction of the second one-way clutch.

In an embodiment, the paper ejecting mechanism further includes a base, wherein the ejecting idler roller is fixed on the base, and the second end of the connecting member is connected with the base of the paper ejecting mechanism.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 14 is a schematic exploded view illustrating a duplex document feeding device according to a second embodiment of the present invention;

FIGS. 18~19 are schematic cross-sectional views illustrating the actions of the linking mechanism of the duplex document feeding device according to the third embodiment of the present invention;

FIG. 20 is a schematic exploded view illustrating a duplex document feeding device according to a fourth embodiment of the present invention;

FIGS. 22~23 are schematic cross-sectional views illustrating the actions of the linking mechanism of the duplex document feeding device according to the fourth embodiment of the present invention.

DETAILED DESCRIPTION OF THE PREFERRED EMBODIMENT

The present invention provides a duplex document feeding device. The duplex document feeding device is installed in a copying device, a printing device, a scanning device or any other widely-used office machine. In an embodiment, the duplex document feeding device is installed in a scanning device for feeding papers, so that the papers may be scanned by the scanning device. It is noted that the duplex document feeding device installed in the scanning device is presented herein for purpose of illustration and description only.

Figure 1:
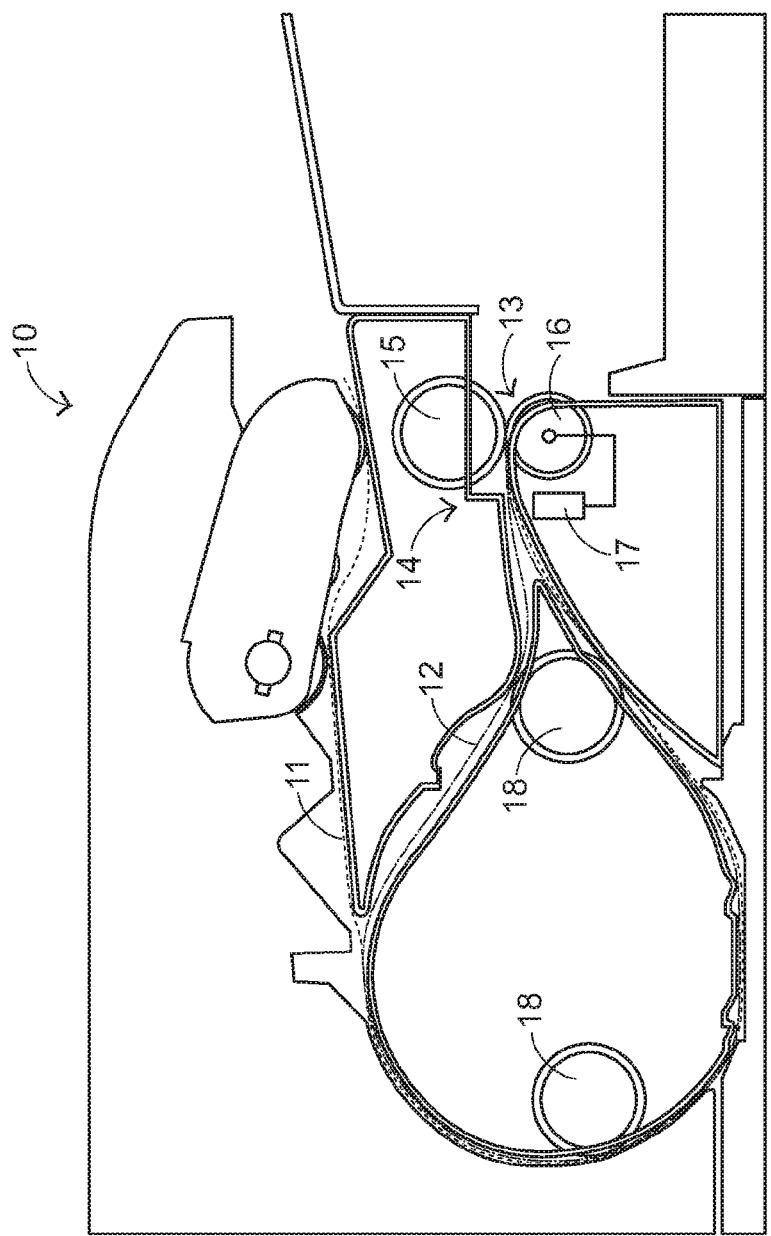
FIG. 1 is a schematic cross-sectional view illustrating a conventional duplex document feeding device.
Figure 2:
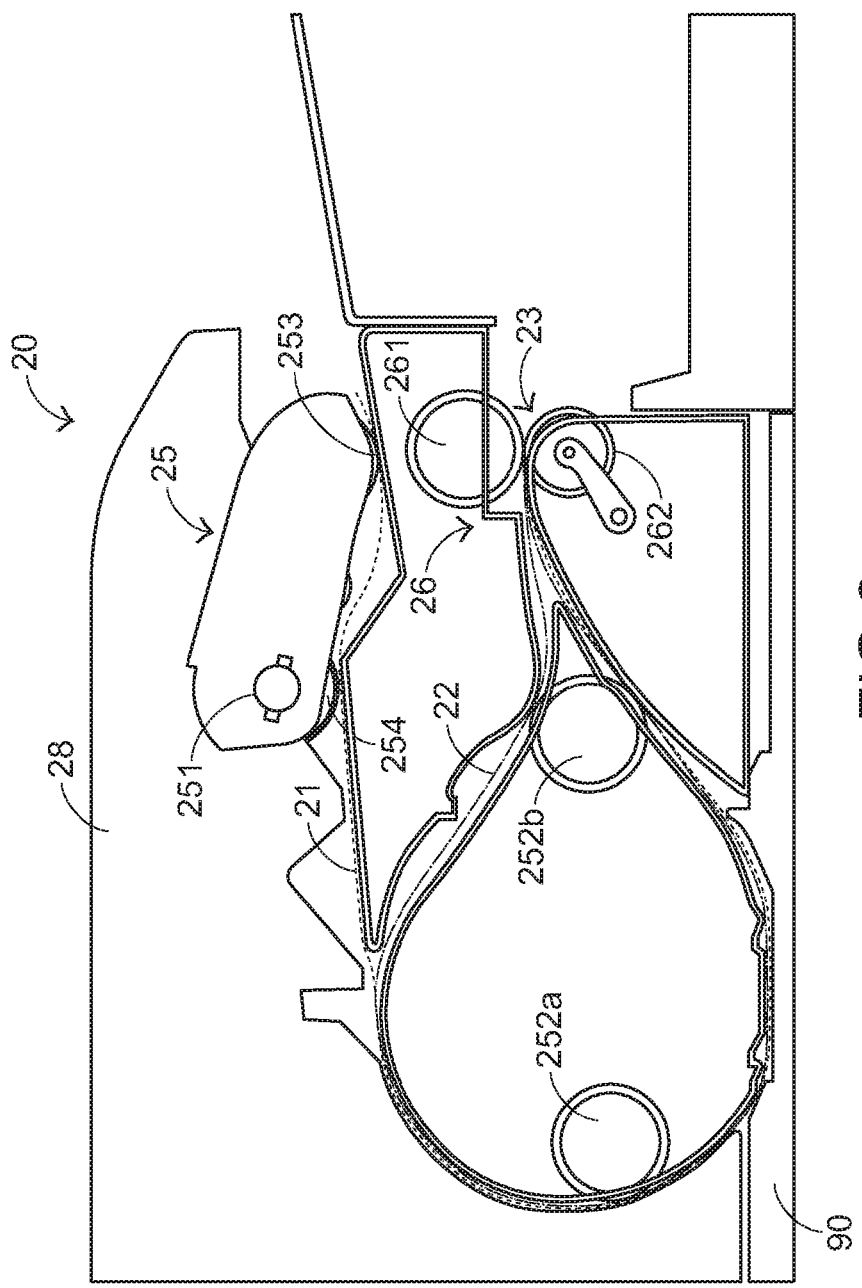
FIG. 2 is a schematic cross-sectional view illustrating a duplex document feeding device of the present invention.
Figure 4:
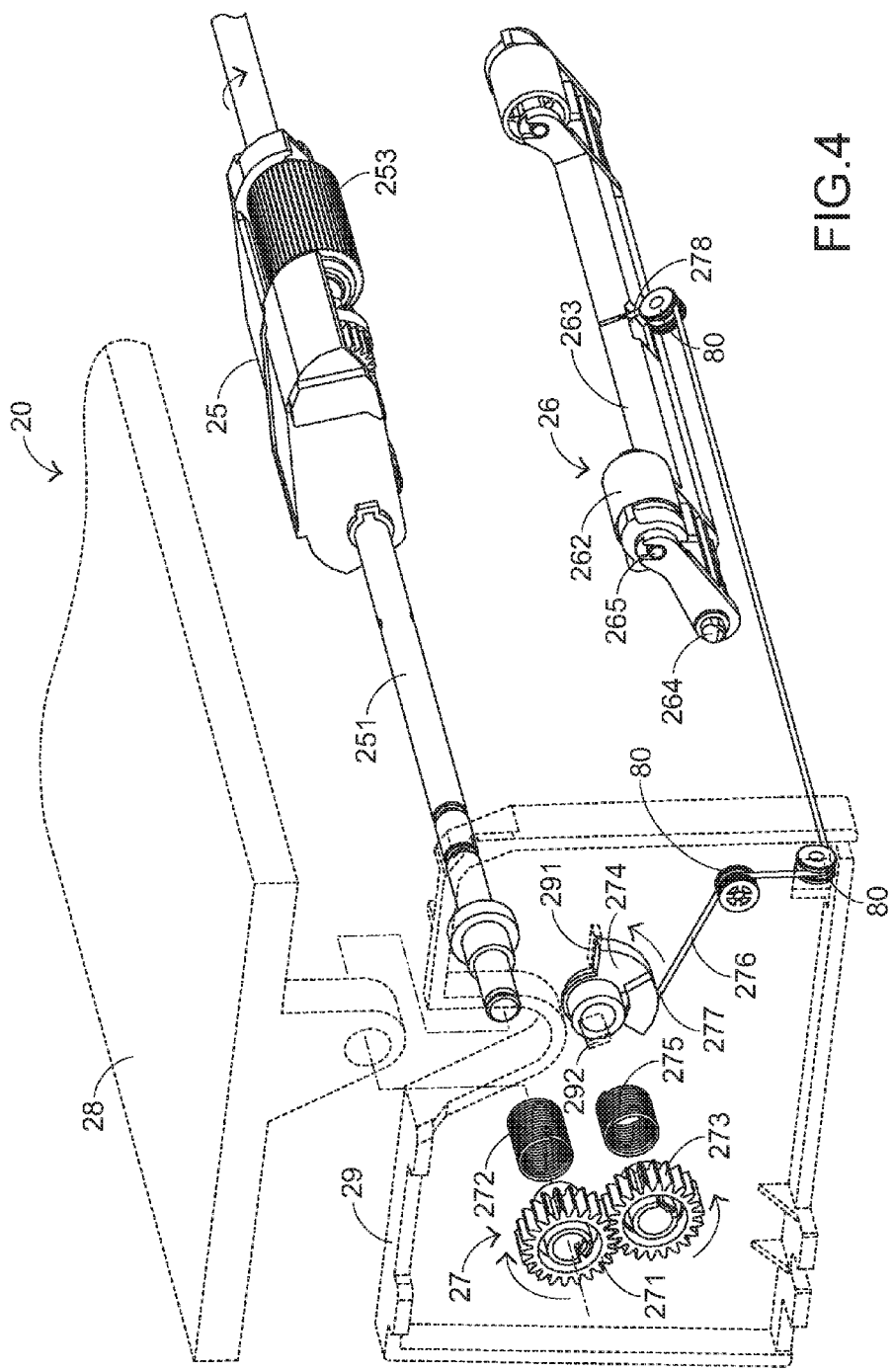
FIG. 4 is a schematic exploded view illustrating the duplex document feeding device according to a first embodiment of the present invention.

Please refer to FIG. 2 and FIG. 4. FIG. 2 is a schematic cross-sectional view illustrating a duplex document feeding device of the present invention. FIG. 4 is a schematic exploded view illustrating the duplex document feeding device according to a first embodiment of the present invention. As shown in FIG. 2, the duplex document feeding device 20 is disposed over a scanning device 90.

As shown in FIG. 2 and FIG. 4, the duplex document feeding device 20 comprises a first paper transfer channel 21, a second paper transfer channel 22, a paper exit 23, a paper pick-up mechanism 25, two transferring rollers 252a and 252b, a paper ejecting mechanism 26, a linking mechanism 27, and an upper cover 28.

Please refer to FIG. 2 again. The paper pick-up mechanism 25 comprises a driving shaft 251, a paper pick-up roller 253, and a paper separation roller 254. The paper ejecting mechanism 26 comprises an ejecting drive roller 261 and an ejecting idler roller 262. In addition, the ejecting drive roller 261 is contacted with the ejecting idler roller 262.

The first paper transfer channel 21 and the second paper transfer channel 22 are disposed within the duplex document feeding device 20 for allowing the paper to go through. For feeding the paper in a duplex mode, the paper is firstly fed into the first paper transfer channel 21, and then the paper is transferred through the first paper transfer channel 21 and ejected from the paper exit 23. Then, the paper is inversely transferred through the paper exit 23 and introduced into the second paper transfer channel 22.

In the following embodiments, for minimizing the volume of the duplex document feeding device, the first paper transfer channel 21 and the second paper transfer channel 22 have a common paper transfer channel. It is noted that the common paper transfer channel is presented herein for purpose of illustration and description only.

Please refer to FIG. 2 again. The paper pick-up mechanism 25 is located at a front end of the first paper transfer channel 21. The paper separation roller 254 is fixed on the driving shaft 251. The paper separation roller 254 and the paper pick-up roller 253 are driven to be rotated by the driving shaft 251 in order to feed a paper into the duplex document feeding device 20. The paper exit 23 is located at a distal end of the first paper transfer channel 21. The two transferring rollers 252a and 252b are respectively disposed in the first paper transfer channel 21 and the second paper transfer channel 22 for transferring the paper which is disposed within the first paper transfer channel 21 or the second paper transfer channel 22.

The paper ejecting mechanism 26 is located at the paper exit 23 for ejecting the paper from the first paper transfer channel 21. In a case that the paper is fed by the duplex document feeding device 20 in the duplex mode, the paper within the first paper transfer channel 21 is firstly ejected from the paper exit 23 by the paper ejecting mechanism 26, and then the paper is introduced into the second paper transfer channel 22.

Moreover, for complying with different functions of various duplex document feeding devices, most of the commercially available duplex document feeding devices have a variety of power sources. For example, the paper pick-up mechanism and the paper ejecting mechanism may be connected with a common power source in order to reduce the fabricating cost. Alternatively, the paper pick-up mechanism and the paper ejecting mechanism may be connected with different power sources in order to facilitate controlling the paper pick-up mechanism. Moreover, the position of the driving shaft may be varied according to the function thereof. For example, for facilitating eliminating the paper jam event, the driving shaft may be disposed on the upper cover of the duplex document feeding device. Whereas, for simplifying the assembling process, the driving shaft may be disposed on a sidewall of the duplex document feeding device.

Consequently, in the following embodiments, the arrangements of some widely-used power sources and the positions of corresponding driving shafts will be illustrated through the corresponding linking mechanisms of different duplex document feeding devices. However, the linking mechanisms of various embodiments of the present invention are designed according to the similar operating principles. In addition, the linking mechanisms may be applied to various duplex document feeding devices. The following duplex document feeding devices are presented herein for purpose of illustration and description only.

Hereinafter, the duplex document feeding device according to the first embodiment of the present invention will be illustrated with reference to FIG. 4. In the first embodiment, the paper pick-up mechanism and the paper ejecting mechanism of the duplex document feeding device are connected with a common power source, and the driving shaft is disposed on the upper cover of the duplex document feeding device. As shown in FIG. 4, the driving shaft 251 is penetrated through the upper cover 28.

Figure 3:
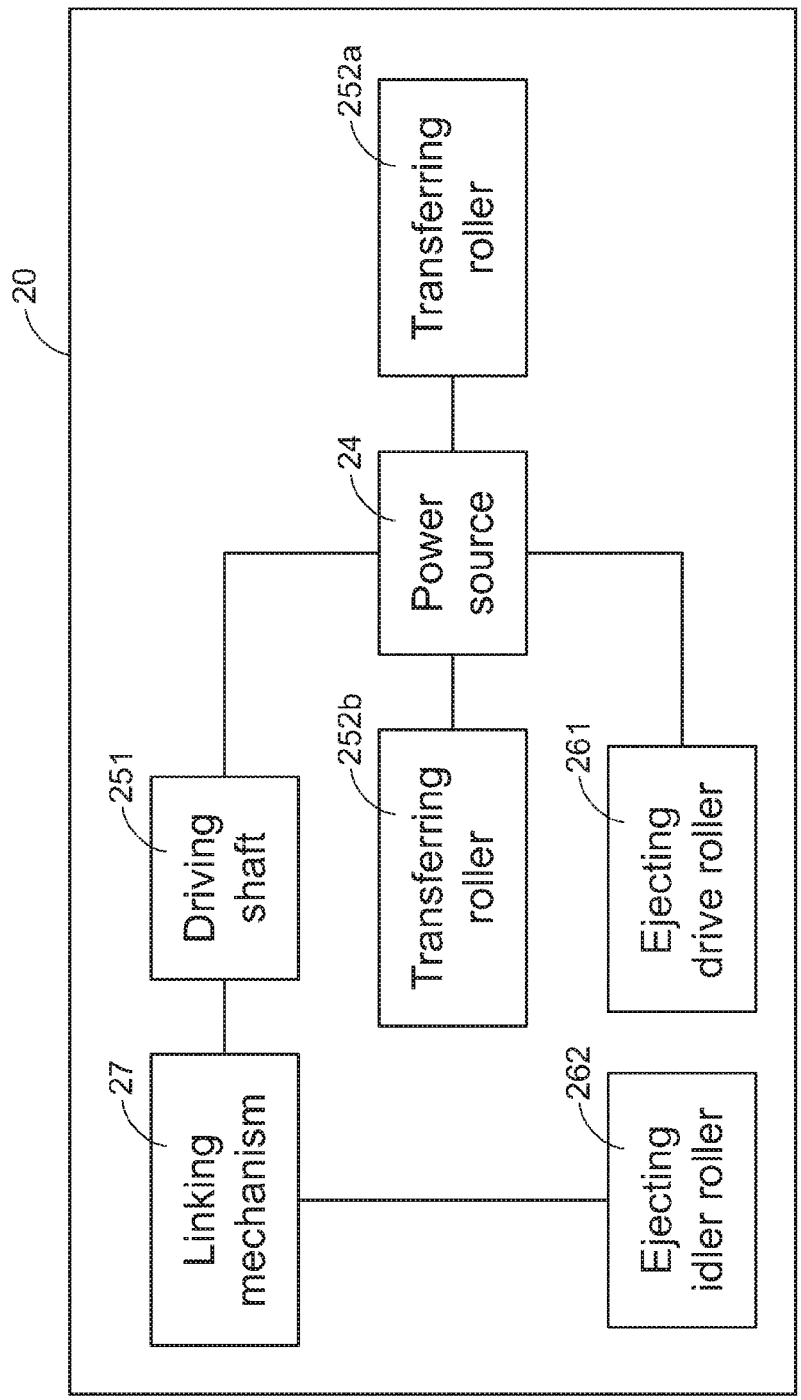
FIG. 3 is a schematic functional block diagram illustrating the duplex document feeding device according to the first embodiment of the present invention.

FIG. 3 is a schematic functional block diagram illustrating the duplex document feeding device according to the first embodiment of the present invention. As shown in FIG. 3, the duplex document feeding device 20 comprises a power source 24. The driving shaft 251, the transferring rollers 252a and 252b and the ejecting drive roller 261 are connected with the power source 24. The linking mechanism 27 is connected with the driving shaft 251. The ejecting idler roller 262 is connected with the linking mechanism 27.

The power source 24 is used for providing a motive power and driving rotation of the driving shaft 251, the transferring rollers 252a and 252b, the ejecting drive roller 261 and the ejecting idler roller 262. When the driving shaft 251 is driven by the power source 24, the linking mechanism 27 is driven to be linked with the ejecting idler roller 262. The actions of the linking mechanism 27 will be illustrated in more details later. In this embodiment, an example of the power source 24 includes but is not limited to a motor (e.g. a DC motor).

The operations of the linking mechanism 27 of the duplex document feeding device 20 according to the first embodiment of the present invention will be illustrated as follows. As shown in FIG. 4, the paper pick-up mechanism 25 comprises the driving shaft 251. Moreover, the linking mechanism 27 comprises a first gear 271, a first one-way clutch 272, a second gear 273, a rotating plate 274, a second one-way clutch 275, and a connecting member 276.

Please refer to FIG. 4. The first gear 271 is sheathed around the driving shaft 251, and located at a side of the driving shaft 251. The first one-way clutch 272 is connected with the driving shaft 251 and the first gear 271. As the driving shaft 251 is rotated, the first gear 271 is driven to be rotated in the same direction as the driving shaft 251 by the first one-way clutch 272. The second gear 273 is located at a side of the first gear 271 and engaged with the first gear 271. As the first gear 271 is rotated, the second gear 273 is driven to be rotated in a direction opposite to the first gear 271 by the first gear 271.

The rotating plate 274 is disposed on a sidewall 29 of the duplex document feeding device 20 and axially located at a side of the second gear 273. The sidewall 29 comprises a first stopping block 291 and a second stopping block 292. The first stopping block 291 and the second stopping block 292 are located at bilateral sides of the rotating plate 274, respectively. Moreover, the second one-way clutch 275 is connected with the second gear 273 and the rotating plate 274. As the second gear 273 is rotated, the rotating plate 274 is driven to be rotated in the same direction as the second gear 273 by the second one-way clutch 275.

Please refer to FIG. 4 again. A first end 277 of the connecting member 276 is connected with the rotating plate 274, and a second end 278 of the connecting member 276 is connected with the paper ejecting mechanism 26. The connecting member 276 is wound around one or mores pulleys 80, so that the direction of the force on the connecting member 276 is changed. It is noted that the pulleys 80 are presented herein for purpose of illustration and description only. In this embodiment, the paper ejecting mechanism 26 further comprises a base 263. A first end 264 of the base 263 is fixed on the duplex document feeding device 20 (not shown). A second end 265 of the base 263 is used for fixing the ejecting idler roller 262.

Moreover, examples of the first one-way clutch 272 and the second one-way clutch 275 include but are not limited to springs. The helix direction of the first one-way clutch 272 is opposite to a helix direction of the second one-way clutch 275, so that the clutch effects in different rotating directions are provided. An example of the connecting member 276 includes but is not limited to a well-known flexible wire such as a metal wire, a nylon rope or a belt.

Figure 10:
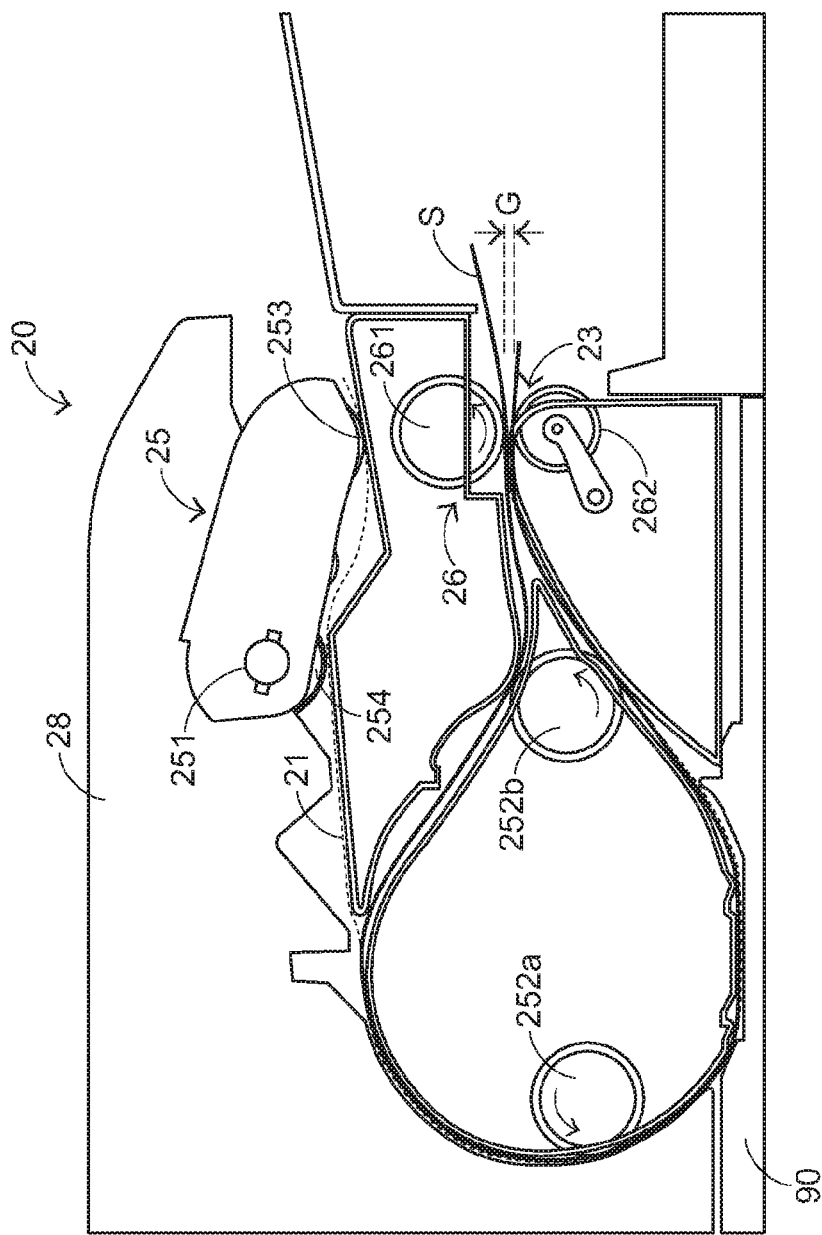
Figure 11:
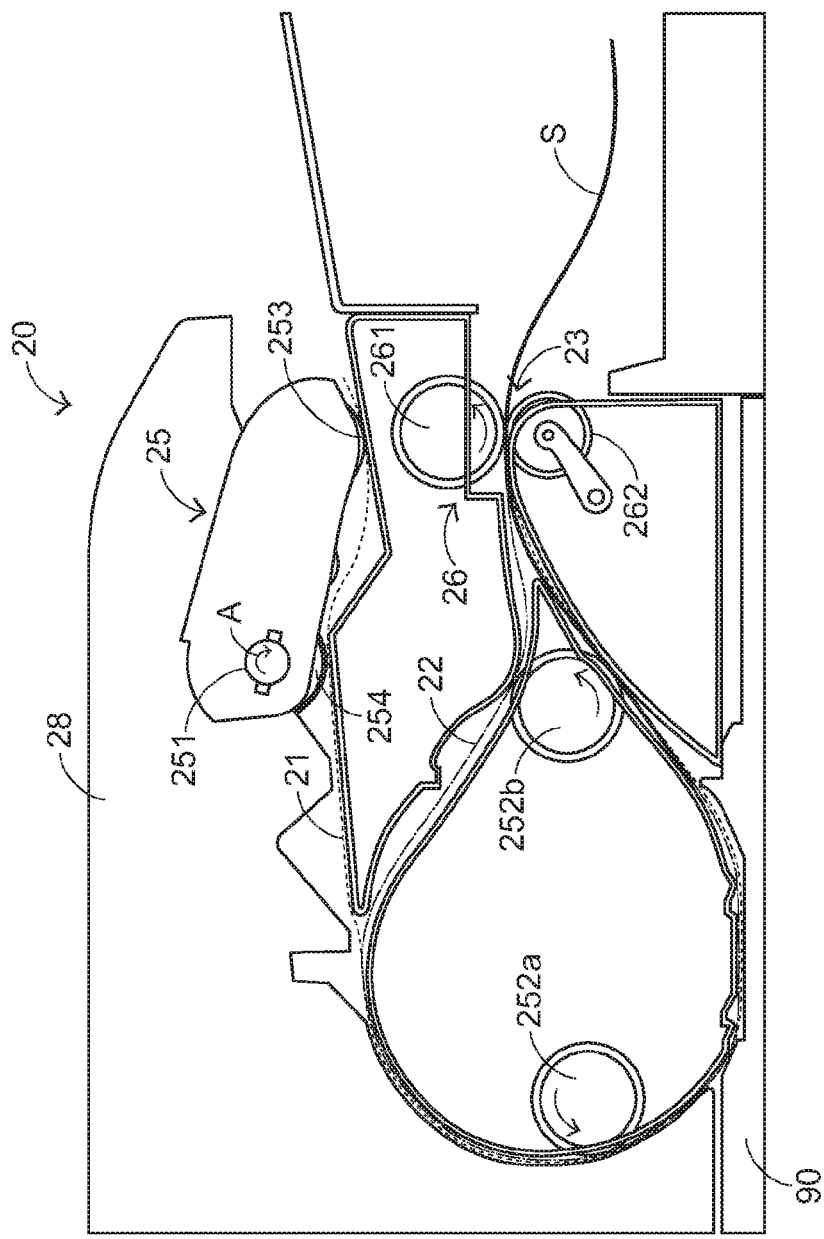
Figure 13:
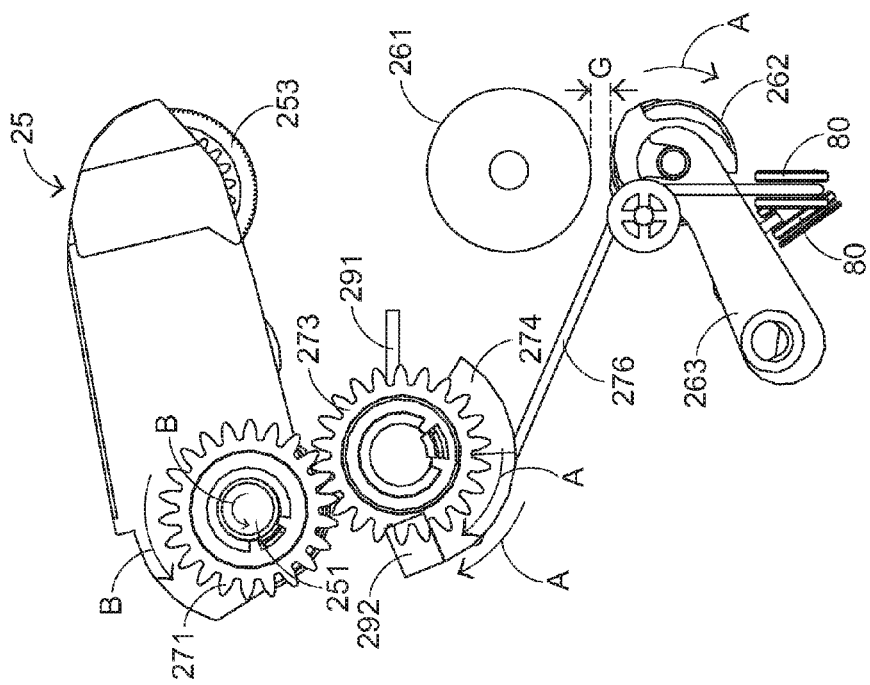
FIGS. 12~13 are schematic cross-sectional views illustrating the actions of the linking mechanism of the duplex document feeding device according to the first embodiment of the present invention.
Figure 12:
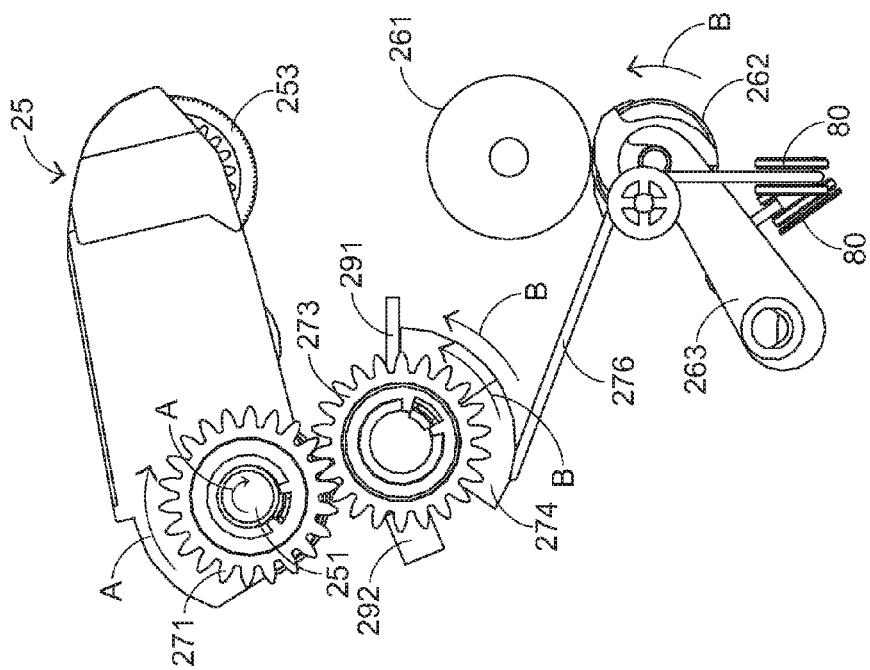

Please refer to FIGS. 5~11 and FIGS. 12~13. FIGS. 5~11 are schematic cross-sectional views illustrating the actions of the duplex document feeding device according to the first embodiment of the present invention. FIGS. 12~13 are schematic cross-sectional views illustrating the actions of the linking mechanism of the duplex document feeding device according to the first embodiment of the present invention.

Figure 5:
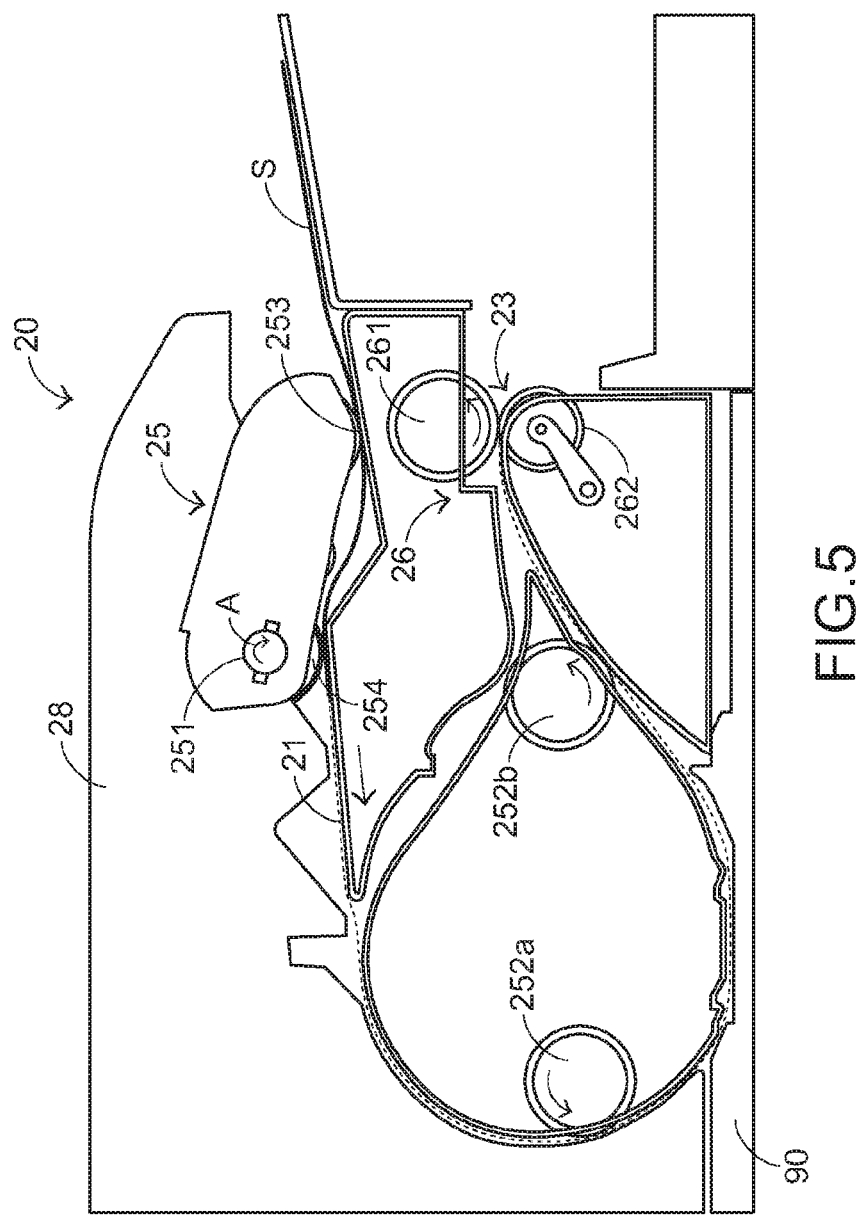
FIGS. 5~11 are schematic cross-sectional views illustrating the actions of the duplex document feeding device according to the first embodiment of the present invention.

Firstly, as shown in FIG. 5, a paper S is picked up by the duplex document feeding device 20. Meanwhile, the driving shaft 251 is rotated in a second direction A, and the paper pick-up mechanism 25 is driven to feed the paper S into the first paper transfer channel 21. Please also refer to FIG. 12. As the driving shaft 251 is rotated in the second direction A, the first gear 271 is rotated in the second direction A. Meanwhile, the second gear 273 is driven to be rotated in a first direction B, and thus the rotating plate 274 is driven to be rotated in the first direction B.

For retaining the motive power to advance the paper S before the paper S reaches the transferring roller 252a, the driving shaft 251 of the paper pick-up mechanism 25 should be continuously rotated to drive the paper separation roller 254 and the paper pick-up roller 253. However, if the rotating angle of the rotating plate 274 is not limited, the connecting member 276 which is connected with the rotating plate 274 may be excessively pulled. Under this circumstance, the connecting member 276 may be suffered from irreversible injury such as deformation or breakage. For solving this problem, the first stopping block 291 is located at a side of the rotating plate 274. As the rotating plate 274 is rotated in the first direction B to be contacted with the first stopping block 291, the drag force between the rotating plate 274 and the first stopping block 291 is greater than the interference amount between the first gear 271 and the first one-way clutch 272.

Consequently, the rotating plate 274 is no longer rotated, and the purpose of protecting the connecting member 276 is achievable.

Figure 6:
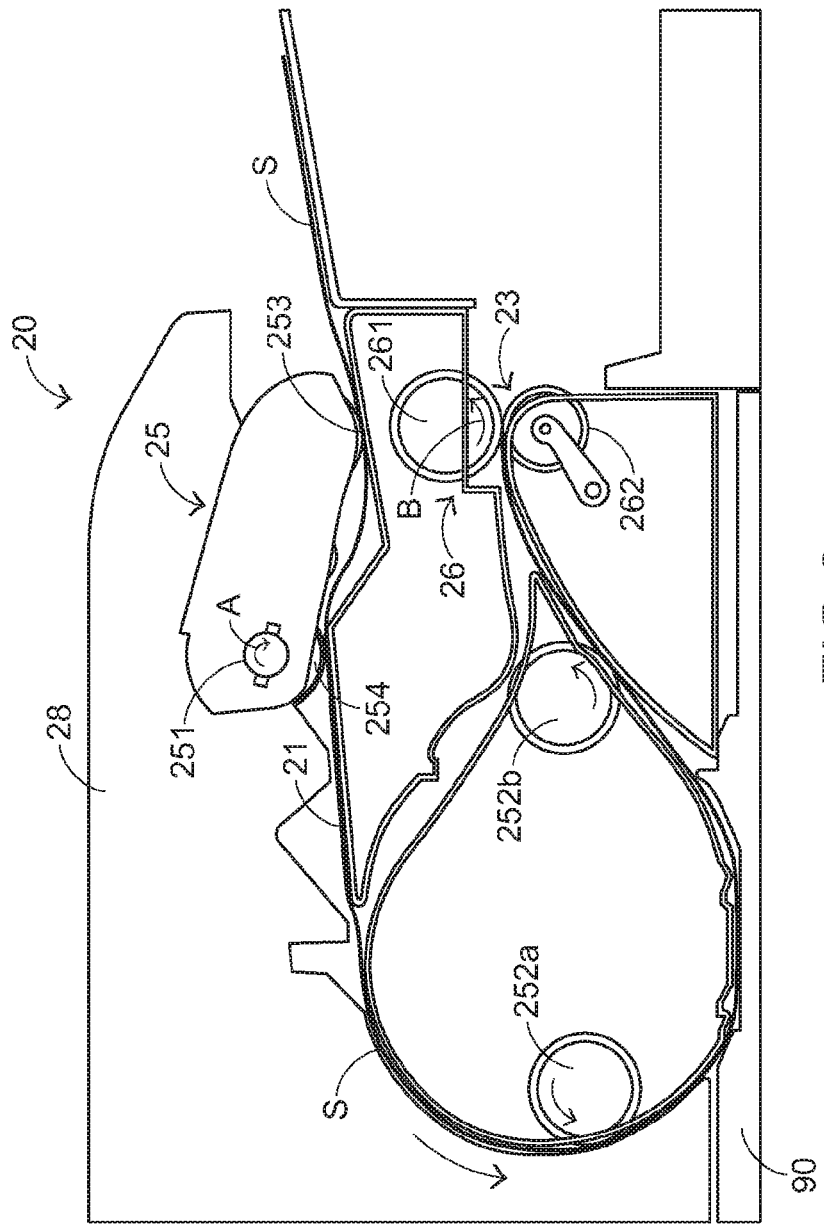
Figure 7:
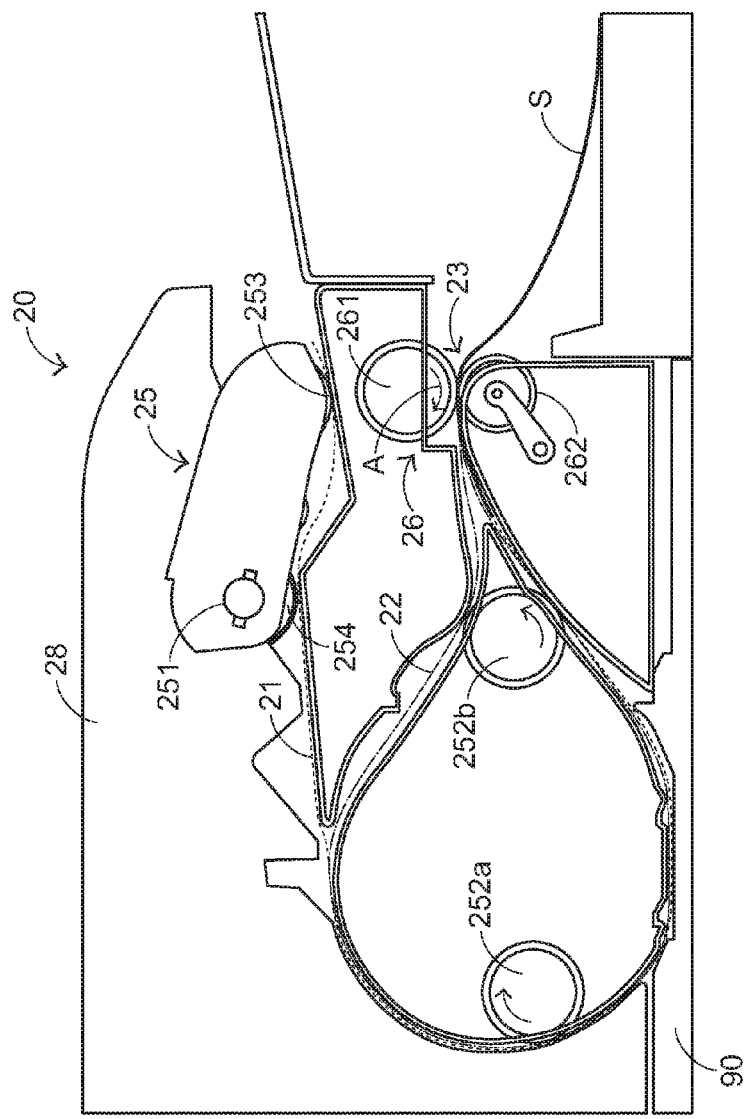

As shown in FIG. 6, the paper S is fed into the first paper transfer channel 21 and moved to the transferring roller 252a. For preventing the paper S from receiving the forces from the transferring roller 252a and the paper pick-up mechanism 25 simultaneously, the driving shaft 251 of the paper pick-up mechanism 25 is no longer rotated in order to minimize the possibility of excessively pulling the paper S. Meanwhile, the paper pick-up mechanism 25 is in a static status. In addition, the paper S is continuously transmitted to the transferring roller 252b by the transferring roller 252a, and then transmitted to the paper ejecting mechanism 26 by the transferring roller 252b.

Please refer to FIG. 6 again. The ejecting drive roller 261 of the paper ejecting mechanism 26 is rotated in the first direction B. After the paper S is moved to the paper ejecting mechanism 26, the paper S is transmitted to the paper exit 23 by the ejecting drive roller 261.

For feeding the paper S in the duplex mode, when the distal end of the paper S is departed from the transferring roller 252b and is about to be ejected from the first paper transfer channel 21 (see FIG. 7), the rotating direction of the power source 24 (see FIG. 3) is changed. Consequently, the ejecting drive roller 261 of the paper ejecting mechanism 26 is rotated in the second direction A to transmit the paper S to the second paper transfer channel 22.

Figure 8:
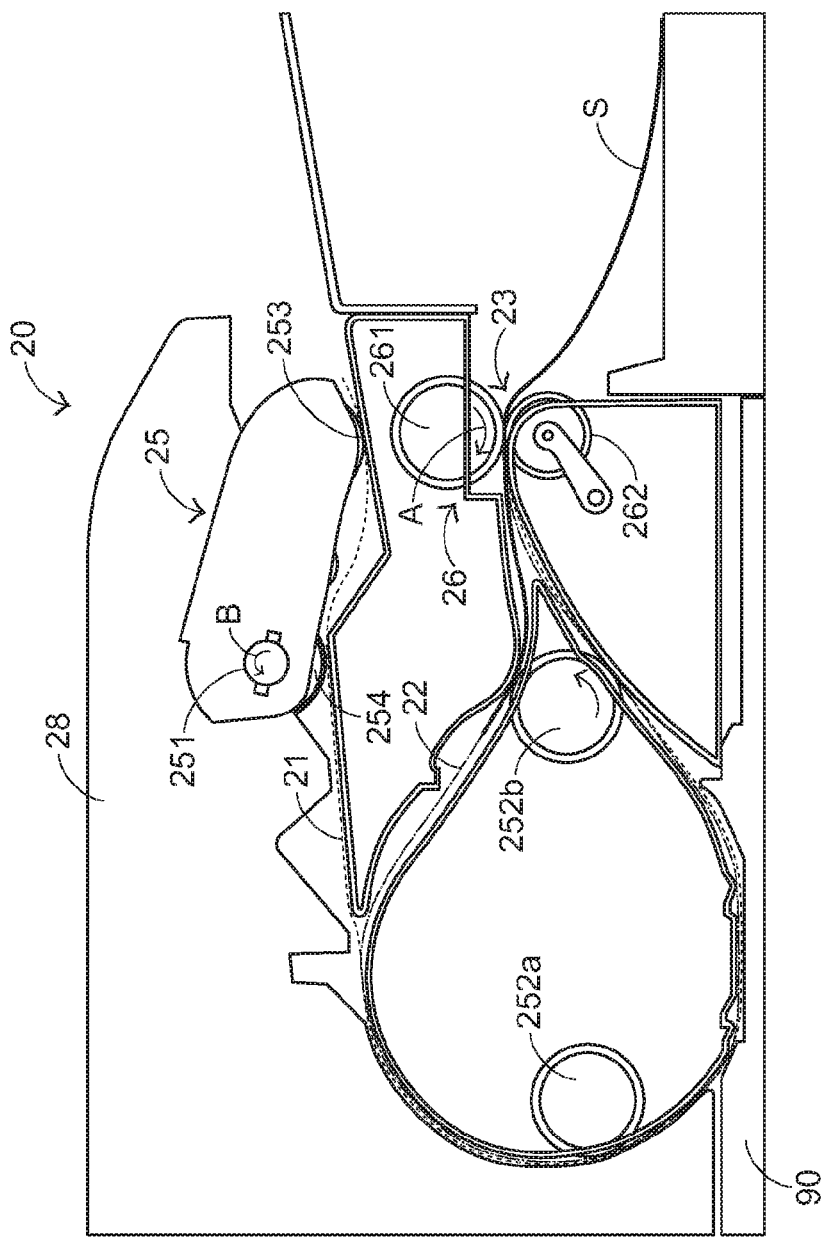

As shown in FIG. 8, the paper S is introduced into the second paper transfer channel 22 and moved to the transferring roller 252b. Meanwhile, the driving shaft 251 of the paper pick-up mechanism 25 is rotated again, and the driving shaft 251 is rotated in the first direction B. Please also refer to FIG. 13. As the driving shaft 251 is rotated in the first direction B, the first gear 271 is rotated in the first direction B. Meanwhile, the second gear 273 is rotated in the second direction A, and thus the rotating plate 274 is driven to be rotated in the second direction A.

Please refer to FIG. 13 again. The connecting member 276 is driven to be moved toward the second stopping block 292 by the rotating plate 274 and the base 263 is driven to be rotated in the second direction A by the rotating plate 274. Under this circumstance, the ejecting idler roller 262 is moved away from the ejecting drive roller 261, and thus a gap G is formed between the ejecting drive roller 261 and the ejecting idler roller 262.

As mentioned above, if the rotating angle of the rotating plate 274 is too large, the connecting member 276 may be excessively pulled. Under this circumstance, the connecting member 276 may be suffered from irreversible injury such as deformation or breakage. For solving this problem, the second stopping block 292 is located at another side of the rotating plate 274. As the rotating plate 274 is rotated in the second direction A to be contacted with the second stopping block 292, the drag force between the rotating plate 274 and the second stopping block 292 is greater than the interference amount between the first gear 271 and the first one-way clutch 272. Consequently, the rotating plate 274 is no longer rotated, and the purpose of protecting the connecting member 276 is achievable.

Figure 9:
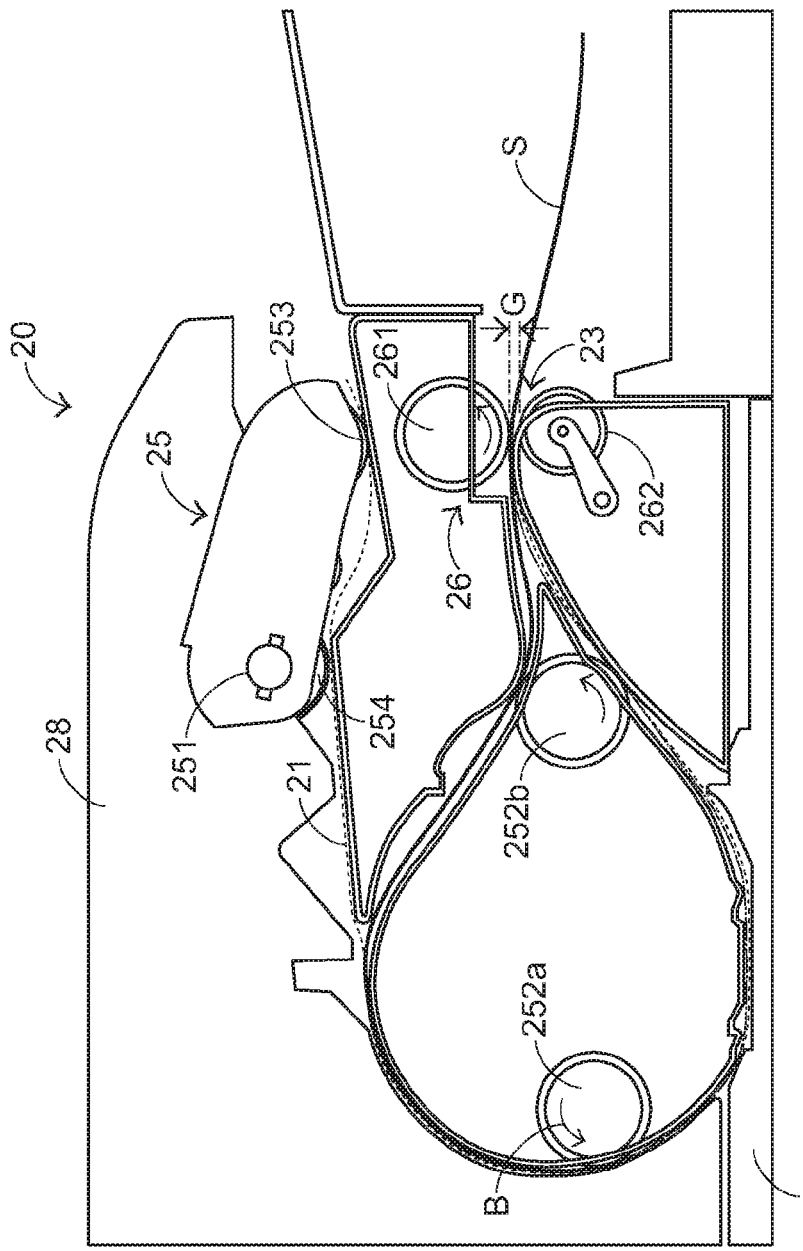

As shown in FIG. 9, when the front end of the paper S is transmitted from the transferring roller 252b to the transferring roller 252a, the rotating direction of the power source 24 (see FIG. 3) is changed again. Consequently, the transferring roller 252a is rotated in the first direction B to transmit the paper S to the paper ejecting mechanism 26. For maintaining the gap G between the ejecting drive roller 261 and the ejecting idler roller 262, the rotation of the driving shaft 251 of the paper pick-up mechanism 25 will be stopped. Meanwhile, the paper pick-up mechanism 25 is in the static status.

As shown in FIG. 10, the paper S is continuously transferred by the transferring rollers 252a and 252b. When the front end of the paper S is moved to the paper ejecting mechanism 26, the front end of the paper S is partially overlapped with the portion of the paper S which is just fed into the second paper transfer channel 22. Meanwhile, due to the gap G between the ejecting drive roller 261 and the ejecting idler roller 262, the paper jam event resulted from the overlapped paper S will be eliminated. Consequently, the front end of the paper S can be smoothly ejected from the paper exit 23.

Please refer to FIG. 11. When the distal end of the paper S is moved to a position near the transferring roller 252b, the driving shaft 251 of the paper pick-up mechanism 25 is rotated again, and the driving shaft 251 is rotated in the second direction A. Please refer to FIG. 12 again. As the driving shaft 251 is rotated in the second direction A, the first gear 271 is rotated in the second direction A. Meanwhile, the second gear 273 is rotated in the first direction B, and thus the rotating plate 274 is driven to be rotated in the first direction B.

As the connecting member 276 is driven by the rotating plate 274 to be moved in a direction toward the first stopping block 291 and the base 263 is driven to be rotated in the first direction B, the ejecting idler roller 262 is contacted with the ejecting drive roller 261. As the rotating plate 274 is rotated in the first direction B to be contacted with the first stopping block 291, the rotating plate 274 is no longer rotated, and the purpose of protecting the connecting member 276 is achievable.

Hereinafter, a duplex document feeding device according to a second embodiment of the present invention will be illustrated with reference to FIG. 14. FIG. 14 is a schematic exploded view illustrating a duplex document feeding device according to a second embodiment of the present invention.

As shown in FIG. 14, the paper pick-up mechanism 25 comprises a driving shaft 251. The sidewall 29 comprises a stopping block 293. The linking mechanism 37 comprises a notched gear 371, a one-way clutch 373, a gear 374, a rotating plate 375, and a connecting member 376. The notched gear 371 comprises a toothed part 372 and a post 379. The toothed part 372 is disposed around a portion of the circumference of the notched gear 371.

In the duplex document feeding device of the second embodiment, the paper pick-up mechanism and the paper ejecting mechanism are connected with a common power source. In addition, the driving shaft is disposed on the upper cover of the duplex document feeding device. Except that the components of the linking mechanism 37 are distinguished, the components of the duplex document feeding device of the second embodiment are substantially identical to those of the first embodiment of FIG. 4, and are not redundantly described herein.

Please refer to FIG. 14 again. The stopping block 293 is located at a side of the notched gear 371. The notched gear 371 is sheathed around the driving shaft 251 and located at a side of the driving shaft 251. The one-way clutch 373 is sheathed around the driving shaft 251. Through the one-way clutch 373, the driving shaft 251 is connected with the notched gear 371. The gear 374 is engaged with the toothed part 372 of the notched gear 371. The rotating plate 375 is located at a side of the gear 374. Moreover, a first end 377 of the connecting member 376 is connected with the rotating plate 375, and a second end 378 of the connecting member 376 is connected with the paper ejecting mechanism 26. The connecting member 376 is wound around one or mores pulleys 80, so that the direction of the force on the connecting member 376 is changed. It is noted that the pulleys 80 are presented herein for purpose of illustration and description only.

In this embodiment, the paper ejecting mechanism 26 further comprises a base 263. A first end 264 of the base 263 is fixed on the duplex document feeding device 20 (not shown). A second end 265 of the base 263 is used for fixing the ejecting idler roller 262.

Moreover, an example of the one-way clutch 373 includes but is not limited to springs. An example of the connecting member 376 includes but is not limited to a well-known flexible wire such as a metal wire, a nylon rope or a belt.

The detailed actions of the duplex document feeding device 20 of the second embodiment are similar to those shown in FIGS. 5~11, and are not redundantly described herein.

Figure 16:
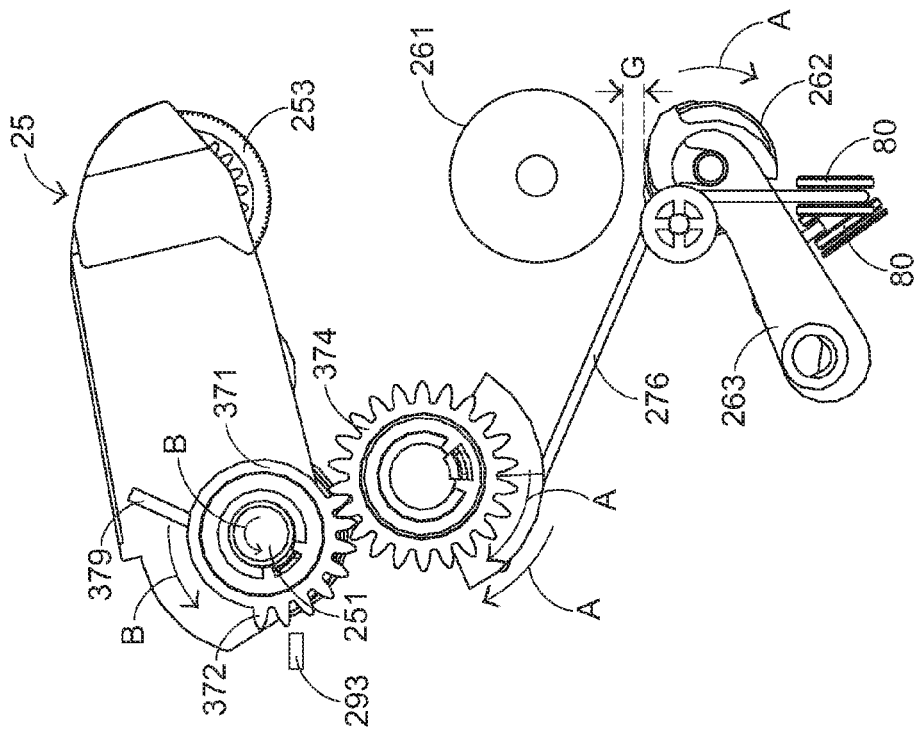
FIGS. 15~16 are schematic cross-sectional views illustrating the actions of the linking mechanism of the duplex document feeding device according to the second embodiment of the present invention.
Figure 15:
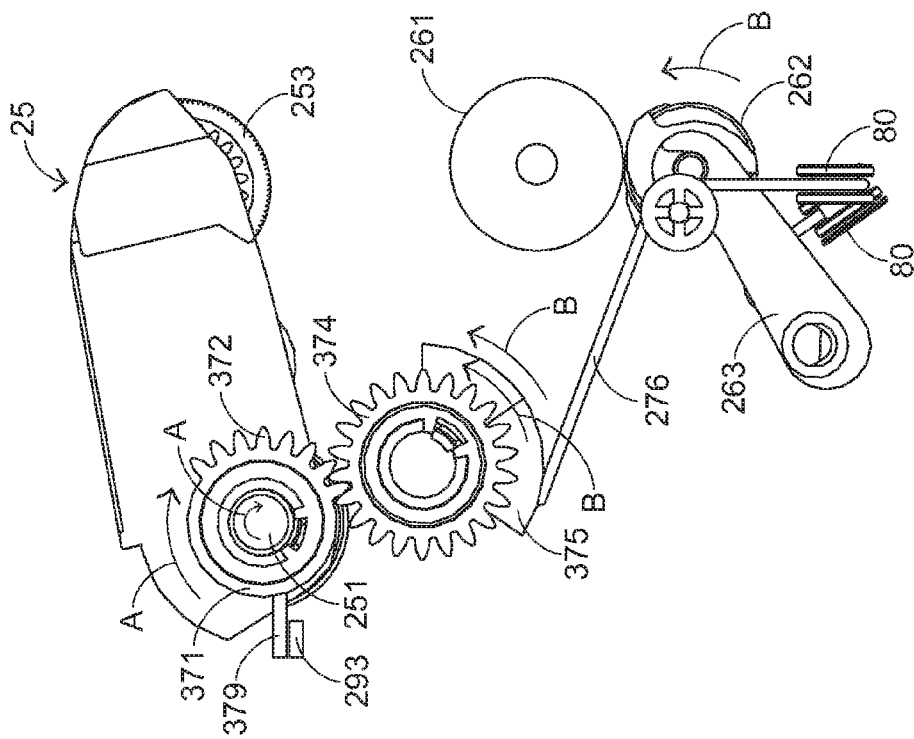

FIGS. 15~16 are schematic cross-sectional views illustrating the actions of the linking mechanism of the duplex document feeding device according to the second embodiment of the present invention. Please refer to FIG. 15. As the driving shaft 251 is rotated in a second direction A, the notched gear 371 is driven to be rotated in the second direction A by the one-way clutch 373 (see FIG. 14). When the toothed part 372 of the notched gear 371 is engaged with the gear 374, the gear 374 is rotated in the first direction B by the notched gear 371, so that the rotating plate 375 is rotated in the first direction B.

As the toothed part 372 of the notched gear 371 is moved away from the gear 374 and no longer engaged with the gear 374, the rotating plate 375 is no longer rotated and the purpose of protecting the connecting member 376 is achievable. However, as the notched gear 371 is continuously driven to be rotated by the driving shaft 251, the post 379 of the notched gear 371 is contacted with the stopping block 293 of the sidewall 29. Meanwhile, the drag force between the post 379 and the stopping block 293 is greater than the interference amount between the notched gear 371 and the one-way clutch 373. Under this circumstance, the notched gear 371 is no longer rotated. Since the toothed part 372 of the notched gear 371 is no longer engaged with the gear 374, the rotating plate 375 is not rotated again.

Please refer to FIG. 16. As the driving shaft 251 is rotated in first direction B, the notched gear 371 is driven to be rotated in the first direction B by the one-way clutch 373. When the toothed part 372 of the notched gear 371 is engaged with the gear 374, the gear 374 is rotated in the second direction A by the notched gear 371, so that the rotating plate 375 is rotated in the second direction A.

As the connecting member 376 is driven to be rotated by the rotating plate 375 and the paper ejecting mechanism 26 is driven to be rotated in the second direction A, the ejecting idler roller 262 is moved away from the ejecting drive roller 261. Consequently, a gap G is formed between the ejecting drive roller 261 and the ejecting idler roller 262. As the toothed part 372 of the notched gear 371 is moved away from the gear 374 and no longer engaged with the gear 374, the rotating plate 375 is no longer rotated and the purpose of protecting the connecting member 376 is achievable. However, as the notched gear 371 is continuously driven to be rotated by the driving shaft 251, the post 379 of the notched gear 371 is contacted with the stopping block 293 of the sidewall 29. Meanwhile, the drag force between the post 379 and the stopping block 293 is greater than the interference amount between the notched gear 371 and the one-way clutch 373. Under this circumstance, the notched gear 371 is no longer rotated. Consequently, since the toothed part 372 of the notched gear 371 is no longer engaged with the gear 374, the rotating plate 375 is not rotated again.

Figure 17:
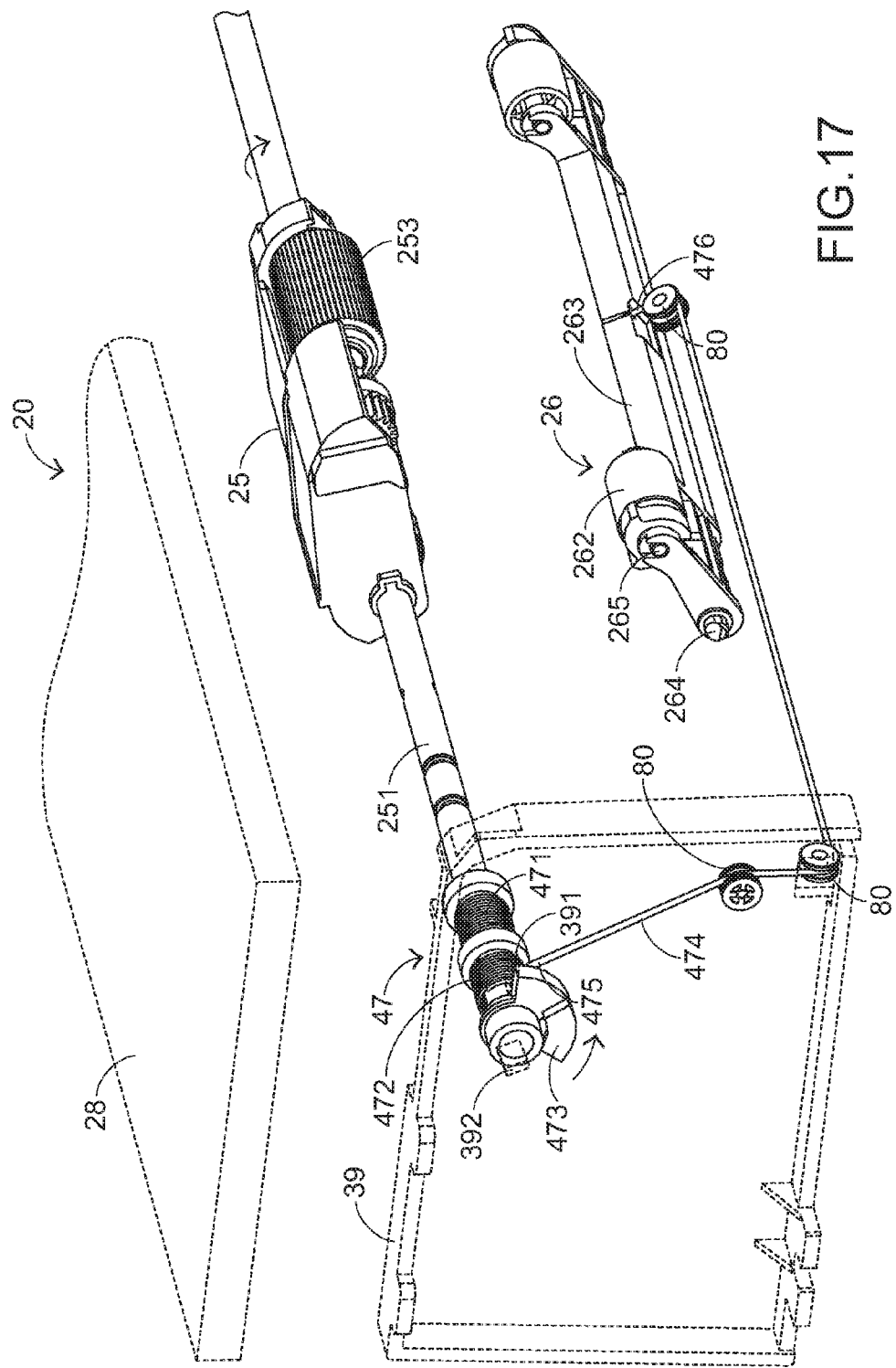
FIG. 17 is a schematic exploded view illustrating a duplex document feeding device according to a third embodiment of the present invention.

Hereinafter, a duplex document feeding device according to a third embodiment of the present invention will be illustrated with reference to FIG. 17. FIG. 17 is a schematic exploded view illustrating a duplex document feeding device according to a third embodiment of the present invention. As shown in FIG. 17, the paper pick-up mechanism 25 comprises a driving shaft 251. Moreover, the linking mechanism 47 comprises a first one-way clutch 471, a second one-way clutch 472, a rotating plate 473, and a connecting member 474. The sidewall 39 comprises a first stopping block 391 and a second stopping block 392. The first stopping block 391 and the second stopping block 392 are located at bilateral sides of the rotating plate 473, respectively.

In the duplex document feeding device of the third embodiment, the paper pick-up mechanism and the paper ejecting mechanism are connected with a common power source. In addition, the driving shaft is disposed on the sidewall of the duplex document feeding device. Except that the driving shaft 251 is penetrated through the sidewall 39 of the duplex document feeding device 20, the components of the duplex document feeding device of the second embodiment are substantially identical to those of the first embodiment of FIG. 4, and are not redundantly described herein.

The first one-way clutch 471 is sheathed around the driving shaft 251. The second one-way clutch 472 is connected with the first one-way clutch 471. The rotating plate 473 is connected with the second one-way clutch 472. A first end 475 of the connecting member 474 is connected with the rotating plate 473, and a second end 476 of the connecting member 474 is connected with the paper ejecting mechanism 26. The connecting member 474 is wound around one or mores pulleys 80, so that the direction of the force on the connecting member 474 is changed. It is noted that the pulleys 80 are presented herein for purpose of illustration and description only.

In this embodiment, the paper ejecting mechanism 26 further comprises a base 263. A first end 264 of the base 263 is fixed on the duplex document feeding device 20 (not shown). A second end 265 of the base 263 is used for fixing the ejecting idler roller 262.

Since the driving shaft 251 of the duplex document feeding device 20 of the third embodiment is penetrated through the sidewall 39 and the driving shaft 251 is not linked to the upper cover 28, the rotating plate 473 can be directly sheathed around the driving shaft 251. In a case that the upper cover 28 is uplifted, the rotating plate 473 is in the static status, and the ejecting idler roller 262 is not shifted.

Moreover, examples of the first one-way clutch 471 and the second one-way clutch 472 include but are not limited to springs. The helix direction of the first one-way clutch 471 is opposite to a helix direction of the second one-way clutch 472, so that the clutch effects in different rotating directions are provided. An example of the connecting member 474 includes but is not limited to a well-known flexible wire such as a metal wire, a nylon rope or a belt.

The detailed actions of the duplex document feeding device 20 of the third embodiment are similar to those shown in FIGS. 5~11, and are not redundantly described herein.

FIGS. 18~19 are schematic cross-sectional views illustrating the actions of the linking mechanism of the duplex document feeding device according to the third embodiment of the present invention. Please refer to FIG. 18. As the driving shaft 251 is rotated in a second direction A, the rotating plate 473 is driven to be rotated in the second direction A by the second one-way clutch 472.

As the connecting member 474 is driven to be moved toward the second stopping block 392 and the base 263 is driven to be rotated in the first direction B the rotating plate 473, the ejecting idler roller 262 is contacted with the ejecting drive roller 261. As the rotating plate 473 is rotated in the second direction A to be contacted with the second stopping block 392, the drag force between the rotating plate 473 and the second stopping block 392 is greater than the interference amount between the rotating plate 473 and the first one-way clutch 471. Consequently, the rotating plate 473 is no longer rotated, and the purpose of protecting the connecting member 474 is achievable.

Please refer to FIG. 19 again. As the driving shaft 251 is rotated in the first direction B, the rotating plate 473 is driven to be rotated in the first direction B by the driving shaft 251. Meanwhile, the connecting member 474 is driven by the rotating plate 473 to be moved in a direction toward the first stopping block 391 and the base 263 is driven to be rotated in the second direction A by the rotating plate 473. Under this circumstance, the ejecting idler roller 262 is moved away from the ejecting drive roller 261, and thus a gap G is formed between the ejecting drive roller 261 and the ejecting idler roller 262.

As the rotating plate 473 is rotated in the first direction B to be contacted with the first stopping block 391, the drag force between the rotating plate 473 and the first stopping block 391 is greater than the interference amount between the rotating plate 473 and the second one-way clutch 472. Consequently, the rotating plate 473 is no longer rotated, and the purpose of protecting the connecting member 474 is achievable.

Hereinafter, a duplex document feeding device according to a fourth embodiment of the present invention will be illustrated with reference to FIG. 20. FIG. 20 is a schematic exploded view illustrating a duplex document feeding device according to a fourth embodiment of the present invention.

As shown in FIG. 20, the paper pick-up mechanism 25 comprises a driving shaft 251. The driving shaft 251 is penetrated through a sidewall 39 of the duplex document feeding device 20. Moreover, the linking mechanism 57 comprises a rotating plate 571, a one-way clutch 572, and a connecting member 573. The sidewall 39 comprises a stopping block 393 and a sensor 394. The stopping block 393 and the sensor 394 are located at bilateral sides of the rotating plate 571, respectively.

The rotating plate 571 is located at a side of the driving shaft 251. The one-way clutch 572 is sheathed around the driving shaft 251, and connected with the driving shaft 251 and the rotating plate 571. A first end 574 of the connecting member 573 is connected with the rotating plate 571, and a second end 575 of the connecting member 573 is connected with the paper ejecting mechanism 26. The connecting member 573 is wound around one or mores pulleys 80, so that the direction of the force on the connecting member 573 is changed. It is noted that the pulleys 80 are presented herein for purpose of illustration and description only.

In this embodiment, the paper ejecting mechanism 26 further comprises a base 263. A first end 264 of the base 263 is fixed on the duplex document feeding device 20 (not shown). A second end 265 of the base 263 is used for fixing the ejecting idler roller 262.

Moreover, an example of the one-way clutch 572 includes but is not limited to springs. An example of the connecting member 573 includes but is not limited to a well-known flexible wire such as a metal wire, a nylon rope or a belt.

In the duplex document feeding device of the fourth embodiment, the paper pick-up mechanism and the paper ejecting mechanism may be connected with different power sources. Moreover, the driving shaft is disposed on the sidewall of the duplex document feeding device. Except that the driving shaft 251 is connected with an additional power source 24', the components of the duplex document feeding device of the fourth embodiment are substantially identical to those of the third embodiment of FIG. 17, and are not redundantly described herein.

Figure 21:
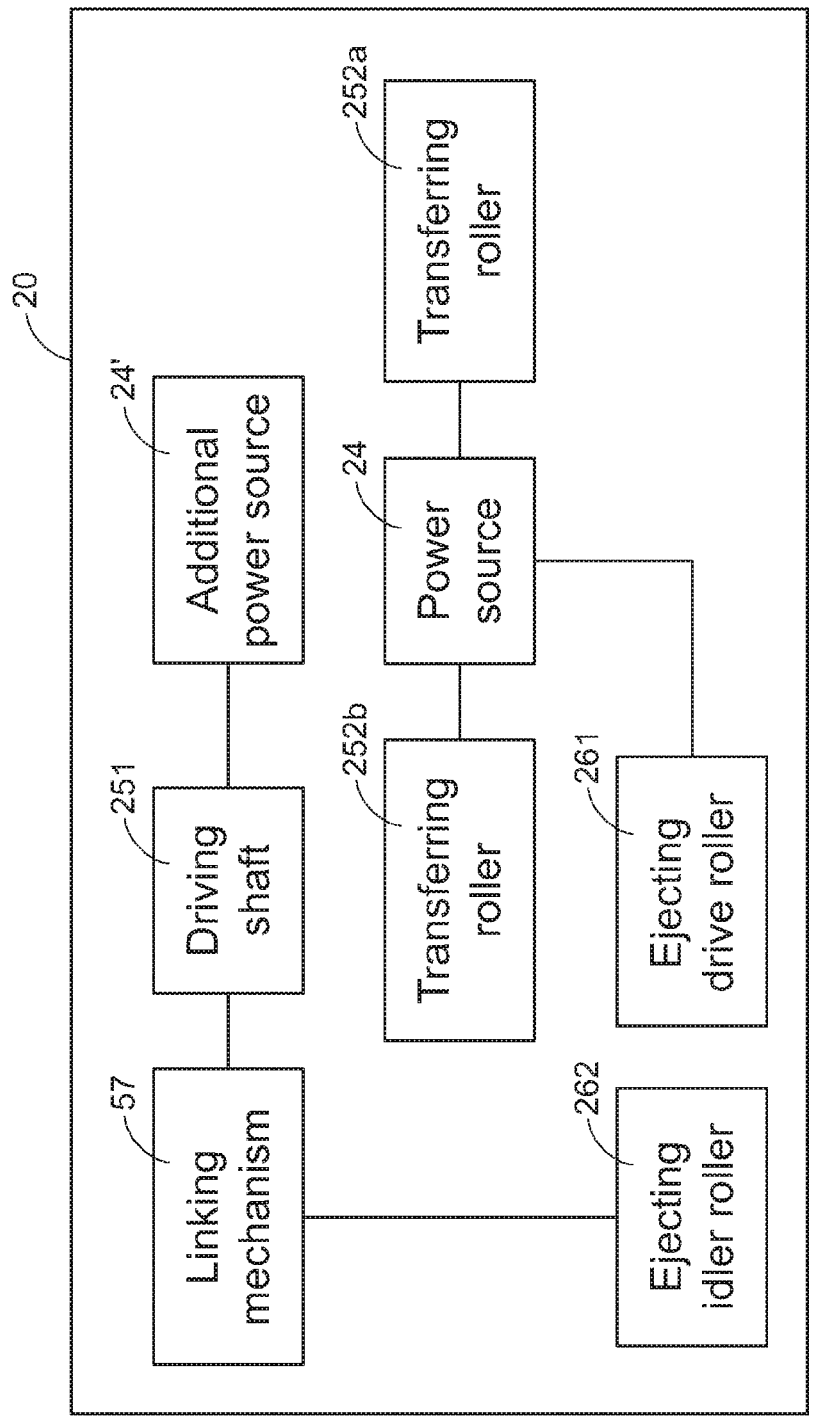
FIG. 21 is a schematic functional block diagram illustrating the duplex document feeding device according to the fourth embodiment of the present invention.

FIG. 21 is a schematic functional block diagram illustrating the duplex document feeding device according to the fourth embodiment of the present invention. As shown in FIG. 21, the duplex document feeding device 20 comprises a driving shaft 251, two transferring rollers 252a and 252b, an ejecting drive roller 261, an ejecting idler roller 262, a power source 24, an additional power source 24', and a linking mechanism 57. The transferring rollers 252a, 252b and the ejecting drive roller 261 are connected with the power source 24. The driving shaft 251 is connected with the additional power source 24'. The linking mechanism 57 is connected with the driving shaft 251 and the ejecting idler roller 262.

The power source 24 is used for providing a motive power and driving rotation of the transferring rollers 252a and 252b, the ejecting drive roller 261 and the ejecting idler roller 262. The additional power source 24' is used for providing a motive power and driving rotation of the driving shaft 251. As the driving shaft 251 is driven by the power source 24, the linking mechanism 57 is driven to be linked with the ejecting idler roller 262 by the driving shaft 251. In this embodiment, an example of each of the power source 24 and the additional power source 24' include but are not limited to a motor (e.g. a DC motor).

The detailed actions of the duplex document feeding device 20 of the fourth embodiment are similar to those shown in FIGS. 5~11, and are not redundantly described herein.

FIGS. 22~23 are schematic cross-sectional views illustrating the actions of the linking mechanism of the duplex document feeding device according to the fourth embodiment of the present invention. Please refer to FIG. 22. As the driving shaft 251 is rotated in a second direction A, the rotating plate 571 is driven to be rotated in the second direction A by the one-way clutch 572. Meanwhile, the connecting member 573 is driven by the rotating plate 571 to be moved in a direction toward the sensor 394, and the base 263 is driven to be rotated in a first direction B by the rotating plate 571.

As the rotating plate 571 is rotated in the second direction A to trigger the sensor 394, the additional power source 24' (see FIG. 21) stops providing the motive power to the driving shaft 251. Consequently, the rotating plate 571 is no longer rotated, and the purpose of protecting the connecting member 573 is achievable. In this embodiment, the power source connected with the transferring rollers 252a, 252b and the ejecting drive roller 261 is different from the power source of the driving shaft 251. Consequently, after the motive power provided to the driving shaft 251 is lost, the power source 24 continuously provides the motive power to the transferring rollers 252a, 252b and the ejecting drive roller 261 in order drive the transferring rollers 252a, 252b to transfer the paper.

Please refer to FIG. 23. As the driving shaft 251 is rotated in the first direction B, the rotating plate 571 is driven to be rotated in the first direction B by the one-way clutch 572, and the base 263 is driven to be rotated in the second direction A by the one-way clutch 572. Under this circumstance, the ejecting idler roller 262 is moved away from the ejecting drive roller 261, and thus a gap G is formed between the ejecting drive roller 261 and the ejecting idler roller 262.

As the rotating plate 571 is rotated in the first direction B to be contacted with the stopping block 393, the drag force between the rotating plate 571 and the stopping block 393 is greater than the interference amount between the rotating plate 571 and the one-way clutch 572. Consequently, the rotating plate 571 is no longer rotated, and the purpose of protecting the connecting member 573 is achievable.

In the above embodiments from the first embodiment to the fourth embodiment, the power source provides the motive power to the driving shaft, and the driving shaft is connected with the linking mechanism in order to drive the linking mechanism. In other words, the linking mechanism acquires the motive power from the power source through the driving shaft. However, those skilled in the art will readily observe that numerous modifications and alterations of the power transmission path may be made while retaining the teachings of the invention. Consequently, the power transmission path of the duplex document feeding device of the present invention is not restricted.

Figure 24:
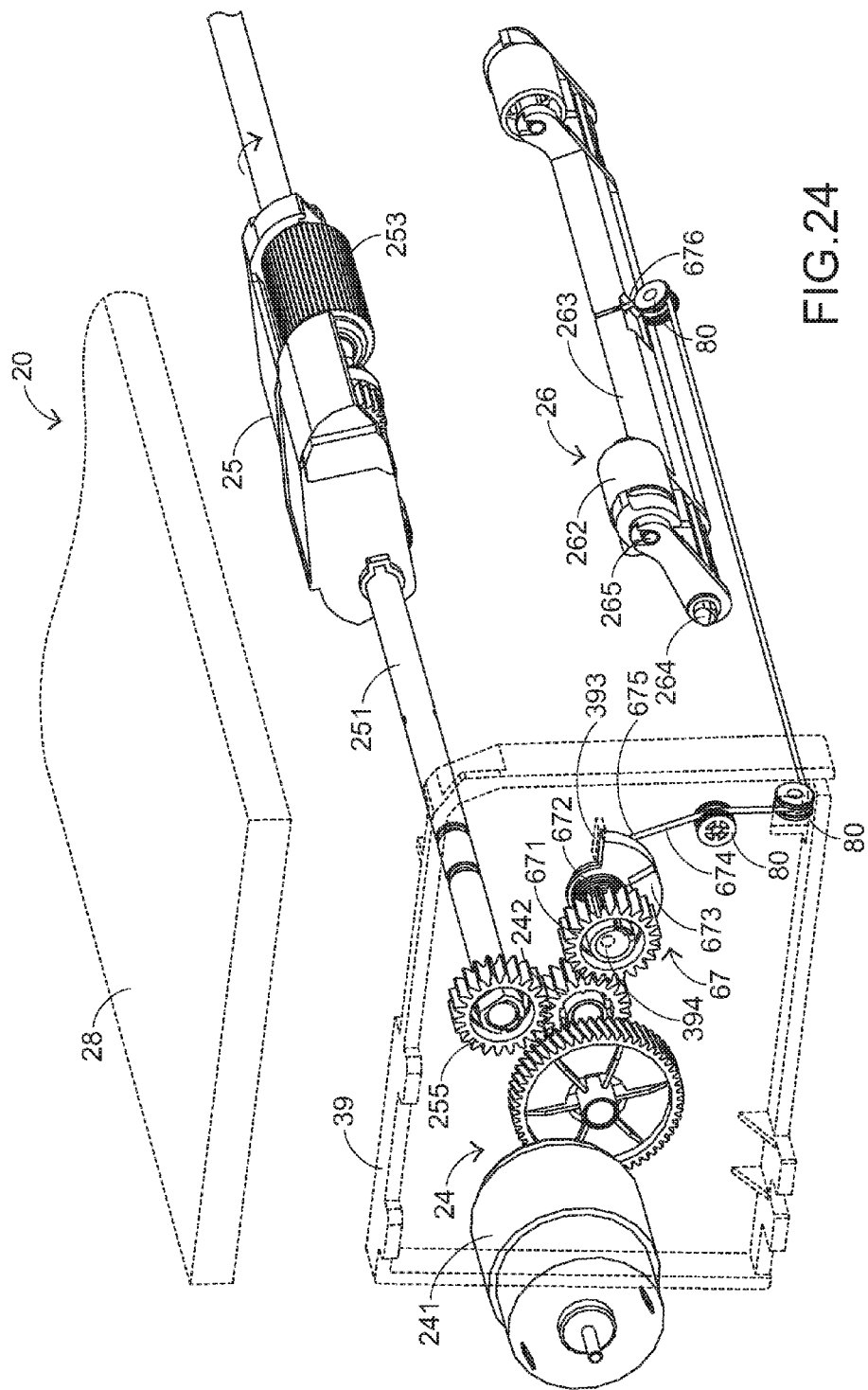
FIG. 24 is a schematic exploded view illustrating a duplex document feeding device according to a fifth embodiment of the present invention.

Hereinafter, a duplex document feeding device according to a fifth embodiment of the present invention will be illustrated with reference to FIG. 24. FIG. 24 is a schematic exploded view illustrating a duplex document feeding device according to a fifth embodiment of the present invention. In the fifth embodiment, the linking mechanism of the duplex document feeding device is connected with the power source for driving the ejecting idler roller. In comparison with the first embodiment of FIG. 4, the linking mechanism and the driving shaft of the duplex document feeding device of the fifth embodiment are connected with the power source and it is not necessary for the linking mechanism to acquire the motive power through the driving shaft.

As shown in FIG. 24, the paper pick-up mechanism 25 comprises a driving shaft 251, a paper pick-up roller 253, and a first gear 255. The driving shaft 251 is penetrated through a sidewall 39 of the duplex document feeding device 20. The first gear 255 is sheathed around the driving shaft 251, and located at a side of the first gear 255. Moreover, the duplex document feeding device 20 has an upper cover 28.

The linking mechanism 67 comprises a second gear 671, a one-way clutch 672, a rotating plate 673, and a connecting member 674. The sidewall 39 comprises a stopping block 393 and a sensor 394. The stopping block 393 and the sensor 394 are located at bilateral sides of the rotating plate 673, respectively. The one-way clutch 672 is connected with the second gear 671 and the rotating plate 673. A first end 675 of the connecting member 674 is connected with the rotating plate 673, and a second end 676 of the connecting member 674 is connected with the paper ejecting mechanism 26. The connecting member 674 is wound around one or mores pulleys 80, so that the direction of the force on the connecting member 674 is changed. It is noted that the pulleys 80 are presented herein for purpose of illustration and description only.

In this embodiment, the paper ejecting mechanism 26 further comprises a base 263. A first end 264 of the base 263 is fixed on the duplex document feeding device 20 (not shown). A second end 265 of the base 263 is used for fixing the ejecting idler roller 262.

Moreover, an example of the one-way clutch 672 includes but is not limited to springs. An example of the connecting member 674 includes but is not limited to a well-known flexible wire such as a metal wire, a nylon rope or a belt.

Please refer to FIG. 24 again. The power source comprises a motor 241 and a third gear 242. The motor 241 is used for driving rotation of the third gear 242. The third gear 242 is engaged with the first gear 255 and the second gear 671 for driving rotation of the first gear 255 and the second gear 671.

The detailed actions of the duplex document feeding device 20 of the fifth embodiment are similar to those shown in FIGS. 5-11, and are not redundantly described herein. Moreover, although the components of the power source of the duplex document feeding device of the fifth embodiment are different from those of the fourth embodiment, the operating principles of the linking mechanism of the fifth embodiment are similar to those of the fourth embodiment as shown in FIGS. 22 and 23, and are not redundantly described herein.

From the above descriptions, the present invention provides a duplex document feeding device. After the paper is ejected from the first paper transfer channel and the paper is introduced into the second paper transfer channel by the paper ejecting mechanism, the linking mechanism is driven by the power source, so that the ejecting idler roller is shifted and moved away from the ejecting drive roller. Due to the gap between the ejecting drive roller and the ejecting idler roller, the paper jam event resulted from the overlapped paper will be eliminated. Consequently, the front end of the paper can be smoothly ejected from the paper exit. Moreover, since the solenoid valve is exempted, the fabricating cost of the duplex document feeding device of the present invention will be reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex document feeding device comprising a first paper transfer channel, a second paper transfer channel and a paper exit, said duplex document feeding device further comprising:
   a power source for providing a motive power;
   a paper pick-up mechanism for feeding a paper into said first paper transfer channel, wherein said paper pick-up mechanism comprises a driving shaft, and said driving shaft is connected with said power source;
   a paper ejecting mechanism located at said paper exit, and comprising:
      an ejecting drive roller connected with said power source for ejecting said paper from said first paper transfer channel and then introducing said paper into said second paper transfer channel; and
      an ejecting idler roller contacted with said ejecting drive roller; and
   a linking mechanism in power communication with said power source and said ejecting idler roller, wherein after said paper is ejected from said first paper transfer channel and said paper is introduced into said second paper transfer channel by said paper ejecting mechanism, said linking mechanism is driven by said power source, so that said ejecting idler roller is shifted and moved away from said ejecting drive roller, wherein said linking mechanism is connected with said driving shaft and said ejecting idler roller.

2. The duplex document feeding device according to claim 1, wherein after said paper is introduced into said second paper transfer channel by said paper ejecting mechanism, said linking mechanism is driven to be linked with said ejecting idler roller by said power source, so that said ejecting idler roller is shifted and moved away from said ejecting drive roller.

3. The duplex document feeding device according to claim 1, wherein said paper pick-up mechanism further comprises a paper pick-up roller and a paper separation roller for feeding said paper into said first paper transfer channel, wherein said paper separation roller is fixed on said driving shaft.

4. The duplex document feeding device according to claim 1, wherein said power source is a motor.

5. The duplex document feeding device according to claim 1, further comprising an upper cover, wherein said driving shaft is penetrated through said upper cover.

6. The duplex document feeding device according to claim 1, further comprising a sidewall, wherein said driving shaft is penetrated through said sidewall.

7. The duplex document feeding device according to claim 1, further comprising plural transferring rollers, wherein said plural transferring rollers are disposed in said first paper transfer channel and said second paper transfer channel, and said plural transferring rollers are connected with said power source.

8. The duplex document feeding device according to claim 7, wherein said linking mechanism comprises:
   a first gear sheathed around said driving shaft and located at a side of said driving shaft;
   a first one-way clutch connected with said driving shaft and said first gear;
   a second gear engaged with said first gear;
   a rotating plate located at a side of said second gear;
   a second one-way clutch connected with said second gear and said rotating plate; and
   a connecting member, wherein a first end of said connecting member is connected with said rotating plate, and a second end of said connecting member is connected with said paper ejecting mechanism, wherein as said rotating plate is driven to be rotated in a first direction by said driving shaft, said ejecting idler roller is driven to be moved away from said ejecting drive roller by said connecting member, wherein as said rotating plate is driven to be rotated in a second direction by said driving shaft, said ejecting idler roller is driven to be moved toward said ejecting drive roller by said connecting member.

9. The duplex document feeding device according to claim 8, further comprising a sidewall, wherein said sidewall comprises a first stopping block and a second stopping block, and said first stopping block and said second stopping block are respectively located at bilateral sides of said rotating plate, wherein as said rotating plate is rotated in said first direction to be contacted with said first stopping block, said rotating plate is not rotated, wherein as said rotating plate is rotated in said second direction to be contacted with said second stopping block, said rotating plate is not rotated.

10. The duplex document feeding device according to claim 8, wherein said connecting member is a flexible wire.

11. The duplex document feeding device according to claim 8, wherein said connecting member is a belt.

12. The duplex document feeding device according to claim 8, wherein said first one-way clutch and said second one-way clutch are springs, and a helix direction of said first one-way clutch is opposite to a helix direction of said second one-way clutch.

13. The duplex document feeding device according to claim 8, wherein said paper ejecting mechanism further comprises a base, wherein said ejecting idler roller is fixed on said base, and said second end of said connecting member is connected with said base of said paper ejecting mechanism.

14. The duplex document feeding device according to claim 7, wherein said linking mechanism comprises:
   a first one-way clutch sheathed around said driving shaft;
   a second one-way clutch connected with said first one-way clutch;
   a rotating plate connected with said second one-way clutch; and
   a connecting member, wherein a first end of said connecting member is connected with said rotating plate, and a second end of said connecting member is connected with said paper ejecting mechanism, wherein as said rotating plate is driven to be rotated in a first direction by said driving shaft, said ejecting idler roller is driven to be moved away from said ejecting drive roller by said connecting member, wherein as said rotating plate is driven to be rotated in a second direction by said driving shaft, said ejecting idler roller is driven to be moved toward said ejecting drive roller by said connecting member.

15. The duplex document feeding device according to claim 14, further comprising a sidewall, wherein said sidewall comprises a first stopping block and a second stopping block, and said first stopping block and said second stopping block are respectively located at bilateral sides of said rotating plate, wherein as said rotating plate is rotated in said first direction to be contacted with said first stopping block, said rotating plate is not rotated, wherein as said rotating plate is rotated in said second direction to be contacted with said second stopping block, said rotating plate is not rotated.

16. The duplex document feeding device according to claim 14, wherein said connecting member is a flexible wire.

17. The duplex document feeding device according to claim 14, wherein said connecting member is a belt.

18. The duplex document feeding device according to claim 14, wherein said first one-way clutch and said second one-way clutch are springs, and a helix direction of said first one-way clutch is opposite to a helix direction of said second one-way clutch.

19. The duplex document feeding device according to claim 14, wherein said paper ejecting mechanism further comprises a base, wherein said ejecting idler roller is fixed on said base, and said second end of said connecting member is connected with said base of said paper ejecting mechanism.

20. The duplex document feeding device according to claim 7, wherein said linking mechanism comprises:
   a notched gear sheathed around said driving shaft and located at a side of said driving shaft, wherein said notched gear comprises a toothed part and a post, and said toothed part is disposed around a portion of a circumference of said notched gear;
   a one-way clutch sheathed around said driving shaft, wherein said driving shaft is connected with said notched gear through said one-way clutch;
   a gear engaged with said toothed part of said notched gear;
   a rotating plate located at a side of said gear; and
   a connecting member, wherein a first end of said connecting member is connected with said rotating plate, and a second end of said connecting member is connected with said paper ejecting mechanism, wherein as said rotating plate is driven to be rotated in a first direction by said driving shaft, said ejecting idler roller is driven to be moved away from said ejecting drive roller by said connecting member, wherein as said rotating plate is driven to be rotated in a second direction by said driving shaft, said ejecting idler roller is driven to be moved toward said ejecting drive roller by said connecting member.

21. The duplex document feeding device according to claim 20, further comprising a sidewall, wherein said sidewall comprises a stopping block, and said stopping block is located at a side of said notched gear, wherein as said notched gear is rotated in said first direction to be contacted with said stopping block, said notched gear is not rotated, wherein as said notched gear is rotated in said second direction to be contacted with said stopping block, said notched gear is not rotated.

22. The duplex document feeding device according to claim 20, wherein said connecting member is a flexible wire.

23. The duplex document feeding device according to claim 20, wherein said connecting member is a belt.

24. The duplex document feeding device according to claim 20, wherein said paper ejecting mechanism further comprises a base, wherein said ejecting idler roller is fixed on said base, and said second end of said connecting member is connected with said base of said paper ejecting mechanism.

25. The duplex document feeding device according to claim 1, further comprising plural transferring rollers, wherein said plural transferring rollers are disposed in said first paper transfer channel and said second paper transfer channel, and said plural transferring rollers are connected with an additional power source.

26. The duplex document feeding device according to claim 25, wherein said linking mechanism comprises:
- a rotating plate located at a side of said driving shaft;
- a one-way clutch connected with said driving shaft and said rotating plate; and
- a connecting member, wherein a first end of said connecting member is connected with said rotating plate, and a second end of said connecting member is connected with said paper ejecting mechanism, wherein as said rotating plate is driven to be rotated in a first direction by said driving shaft, said ejecting idler roller is driven to be moved away from said ejecting drive roller by said connecting member, wherein as said rotating plate is driven to be rotated in a second direction by said driving shaft, said ejecting idler roller is driven to be moved toward said ejecting drive roller by said connecting member.

27. The duplex document feeding device according to claim 26, further comprising a sidewall, a stopping block and a sensor, wherein said stopping block is disposed on said sidewall, and said stopping block and said sensor are respectively located at bilateral sides of said rotating plate, wherein as said rotating plate is rotated in said first direction to be contacted with said stopping block, said rotating plate is not rotated, wherein as said rotating plate is rotated in said second direction to trigger said sensor, said rotating plate is not rotated.

28. The duplex document feeding device according to claim 26, wherein said connecting member is a flexible wire.

29. The duplex document feeding device according to claim 26, wherein said connecting member is a belt.

30. The duplex document feeding device according to claim 26, wherein said first one-way clutch and said second one-way clutch are springs, and a helix direction of said first one-way clutch is opposite to a helix direction of said second one-way clutch.

31. The duplex document feeding device according to claim 26, wherein said paper ejecting mechanism further comprises a base, wherein said ejecting idler roller is fixed on said base, and said second end of said connecting member is connected with said base of said paper ejecting mechanism.

* * * * *